(12) United States Patent  
Dearman

(10) Patent No.: US 9,191,798 B2
(45) Date of Patent: Nov. 17, 2015

(54) METHODS, APPARATUSES, AND COMPUTER PROGRAM PRODUCTS FOR SAVING AND RESUMING A STATE OF A COLLABORATIVE INTERACTION SESSION BETWEEN DEVICES BASED ON THEIR POSITIONAL RELATIONSHIP

(75) Inventor: David A. Dearman, San Bruno, CA (US)

(73) Assignee: Nokia Technologies Oy, Espoo, FL (US)

( * ) Notice: Subject to any disclaimer, the term of this patent is extended or adjusted under 35 U.S.C. 154(b) by 215 days.

(21) Appl. No.: 13/416,725

(22) Filed: Mar. 9, 2012

(65) Prior Publication Data

US 2013/0238712 A1 Sep. 12, 2013

(51) Int. Cl.
*H04L 29/08* (2006.01)
*H04W 4/20* (2009.01)
*H04W 4/02* (2009.01)

(52) U.S. Cl.
CPC ............ *H04W 4/206* (2013.01); *H04L 67/142* (2013.01); *H04L 67/145* (2013.01); *H04W 4/023* (2013.01); *H04W 4/026* (2013.01)

(58) Field of Classification Search
CPC . G06Q 10/1095; H04L 63/18; H04M 1/6066; H04W 52/0241; H04W 68/005
USPC .................. 709/203, 204, 205, 223, 224, 227
See application file for complete search history.

(56) References Cited

U.S. PATENT DOCUMENTS 7,024,206 B2    4/2006  Hamanaga et al.
7,069,298 B2 *  6/2006  Zhu et al. ...................... 709/204

2004/0030749 A1 *  2/2004  Bowman-Amuah .......... 709/204
2007/0239981 A1 * 10/2007  Lessing ......................... 713/164
2008/0070697 A1    3/2008  Robinson et al.
2008/0161111 A1    7/2008  Schuman
2008/0189365 A1 *  8/2008  Narayanaswami et al. ... 709/204
2009/0322690 A1   12/2009  Hiltunen et al.

(Continued)

FOREIGN PATENT DOCUMENTS

EP   2 146 490 A1   1/2010
WO   WO 2011/112498 A1   9/2011

OTHER PUBLICATIONS

International Search Report and Written Opinion for Application No. PCT/FI2013/050206, dated Jul. 22, 2013.

(Continued)

*Primary Examiner* — Barbara Burgess
(74) *Attorney, Agent, or Firm* — Alston & Bird LLP

(57) ABSTRACT

Methods, apparatuses, and computer program products are herein provided for saving and resuming a state of a collaborative interaction session between devices based on the positional relationship of the devices. A method may include determining, in an instance in which a first device and at least one second device are engaged in a collaborative interaction session, a first positional relationship. The method may further include receiving an indication of termination of the collaborative interaction session, determining the collaborative interaction session state and causing that state to be stored. The method may further include determining a second positional relationship and causing the collaborative interaction session to resume at the stored collaborative interaction session state based upon a relationship between the first positional relationship and the second positional relationship. Corresponding apparatuses and computer program products are also provided.

16 Claims, 20 Drawing Sheets

(56) References Cited

U.S. PATENT DOCUMENTS

| | | |
|---|---|---|
| 2010/0216402 A1 | 8/2010 | Appleby et al. |
| 2011/0081923 A1 | 4/2011 | Forutanpour et al. |
| 2011/0154014 A1 | 6/2011 | Thorn |
| 2011/0314153 A1 | 12/2011 | Bathiche et al. |

OTHER PUBLICATIONS

Activity Restart on Rotation Android [online] [retrieved Feb. 1, 2012]. Retrieved from the Internet: <URL: http://stackoverflow.com/questions/456211/activity-restart-on-rotation-android>. 5 pages.

* cited by examiner

METHODS, APPARATUSES, AND COMPUTER PROGRAM PRODUCTS FOR SAVING AND RESUMING A STATE OF A COLLABORATIVE INTERACTION SESSION BETWEEN DEVICES BASED ON THEIR POSITIONAL RELATIONSHIP

TECHNOLOGICAL FIELD

An example embodiment of the present invention relates generally to user interface technology and, more particularly, relates to methods, apparatuses, and computer program products for saving and resuming a state of a collaborative interaction session between devices based on the positional relationship of the devices with respect to each other.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Increased functionality in mobile computing devices has led to increasing use and, therefore, an increasing number of mobile computing devices worldwide. Multiple mobile computing devices may even engage in a collaborative interaction session, thereby allowing users to interact with each other and perform collaborative operations through their devices.

BRIEF SUMMARY

Engaging in a collaborative interaction session between devices, while useful, may be difficult to properly establish. Moreover, depending on the complexity and/or estimated time to completion of the collaborative interaction session, users may need to pause the collaborative interaction session. However, pausing may require taking active steps to not only save the current state of the collaborative interaction session, but also re-initiate the collaborative interaction session and locate/reload the saved state of the collaborative interaction session. These steps can be time-consuming.

Often, however, devices that are engaged in a collaborative interaction session may be positioned in a routine orientation, such as facing each other, or in a routine position, such as within 6 inches of each other. As such, some embodiments of the present invention may be configured to detect the routine orientation and/or position in which the collaborative interaction session is taking place. Then, the current state of the collaborative interaction session may be saved upon termination of the collaborative interaction session and resumed simply by returning the devices to the routine orientation. Thus, embodiments of the present invention provide for simplified resumption of a previous state of a collaborative interaction session.

As such, embodiments of the present invention provide for saving and resuming a state of a collaborative interaction session between devices based on the positional relationship of the devices with respect to each other. In one example embodiment, a method includes determining, by a processor, in an instance in which a first device and at least one second device are engaged in a collaborative interaction session, a first positional relationship between the first device and the at least one second device. The method further includes receiving an indication of termination of the collaborative interaction session between the first device and the at least one second device. The method further includes determining the collaborative interaction session state. The method further includes causing the collaborative interaction session state to be stored. The method further includes determining a second positional relationship between the first device and the at least one second device. The method further includes causing the collaborative interaction session between the first device and the at least one second device to resume at the stored collaborative interaction session state based upon a relationship between the first positional relationship and the second positional relationship.

In some embodiments, causing the collaborative interaction session between the first device and the at least one second device to resume at the stored collaborative interaction session state may comprise causing the collaborative interaction session to resume at the stored collaborative interaction session state in an instance in which the second positional relationship satisfies the first positional relationship within a predetermined positional relationship tolerance.

In some embodiments, determining the first positional relationship may further comprise determining the first positional relationship based at least in part on the proximity of the first device to the at least one second device. Additionally, determining the second positional relationship may further comprise determining the second positional relationship based at least in part on the proximity of the first device to the at least one second device.

In some embodiments, determining the first positional relationship may further comprise determining the first positional relationship based at least in part on orientation of the first device relative to the at least one second device. Additionally, determining the second positional relationship may further comprise determining the second positional relationship based at least in part on orientation of the first device relative to the at least one second device.

In some embodiments, determining the first positional relationship may further comprise determining the first positional relationship based at least in part on orientation of the at least one second device relative to the first device. Additionally, determining the second positional relationship may further comprise determining the second positional relationship based at least in part on orientation of the at least one second device relative to the first device.

In some embodiments, receiving an indication of termination of the collaborative interaction session may comprise receiving an indication from the first device or the at least one second device that the collaborative interaction session is terminated.

In other embodiments, receiving an indication of termination of the collaborative interaction session may comprise determining a third positional relationship between the first device and the at least one second device based at least in part on orientation of the first device relative to the at least one second device and determining an instance in which the third positional relationship does not satisfy the first positional relationship within a pre-determined positional relationship tolerance.

In some embodiments, causing the collaborative interaction session between the first device and the at least one second device to resume at the stored collaborative interaction session state may comprise automatically causing the collaborative interaction session between the first device and the at least one second device to resume at the stored collaborative interaction session state based upon the relationship between the first positional relationship and the second positional relationship.

In some embodiments, the method may further include causing a user of the first device or the at least one second device to be prompted as to whether the collaborative interaction session should be resumed at the stored collaborative interaction session state. Additionally, causing the collaborative interaction session between the first device and the at least one second device to resume at the stored collaborative interaction session state may comprise causing the collaborative interaction session between the first device and the at least one second device to resume at the stored collaborative interaction session state in an instance in which the user indicates that the collaborative interaction session should be resumed at the stored collaborative interaction session state.

In another example embodiment, an apparatus comprises at least one processor and at least one memory storing computer program code with the at least one memory and stored computer program code being configured, with the at least one processor, to cause the apparatus to determine, in an instance in which a first device and at least one second device are engaged in a collaborative interaction session, a first positional relationship between the first device and the at least one second device. The at least one memory and stored computer program code are configured, with the at least one processor, to further cause the apparatus to receive an indication of termination of the collaborative interaction session between the first device and the at least one second device. The at least one memory and stored computer program code are configured, with the at least one processor, to further cause the apparatus to determine the collaborative interaction session state. The at least one memory and stored computer program code are configured, with the at least one processor, to further cause the apparatus to cause the collaborative interaction session state to be stored. The at least one memory and stored computer program code are configured, with the at least one processor, to further cause the apparatus to determine a second positional relationship between the first device and the at least one second device. The at least one memory and stored computer program code are configured, with the at least one processor, to further cause the apparatus to cause the collaborative interaction session between the first device and the at least one second device to resume at the stored collaborative interaction session state based upon a relationship between the first positional relationship and the second positional relationship.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising determining, in an instance in which a first device and at least one second device are engaged in a collaborative interaction session, a first positional relationship between the first device and the at least one second device. The method further includes receiving an indication of termination of the collaborative interaction session between the first device and the at least one second device. The method further includes determining the collaborative interaction session state. The method further includes causing the collaborative interaction session state to be stored. The method further includes determining a second positional relationship between the first device and the at least one second device. The method further includes causing the collaborative interaction session between the first device and the at least one second device to resume at the stored collaborative interaction session state based upon a relationship between the first positional relationship and the second positional relationship.

In another example embodiment, an apparatus is provided. The apparatus comprises means for determining, in an instance in which a first device and at least one second device are engaged in a collaborative interaction session, a first positional relationship between the first device and the at least one second device. The apparatus further comprises means for receiving an indication of termination of the collaborative interaction session between the first device and the at least one second device. The apparatus further comprises means for determining the collaborative interaction session state. The apparatus further comprises means for causing the collaborative interaction session state to be stored. The apparatus further comprises means for determining a second positional relationship between the first device and the at least one second device. The apparatus further comprises means for causing the collaborative interaction session between the first device and the at least one second device to resume at the stored collaborative interaction session state based upon a relationship between the first positional relationship and the second positional relationship.

BRIEF DESCRIPTION OF THE DRAWINGS

Figure 1:
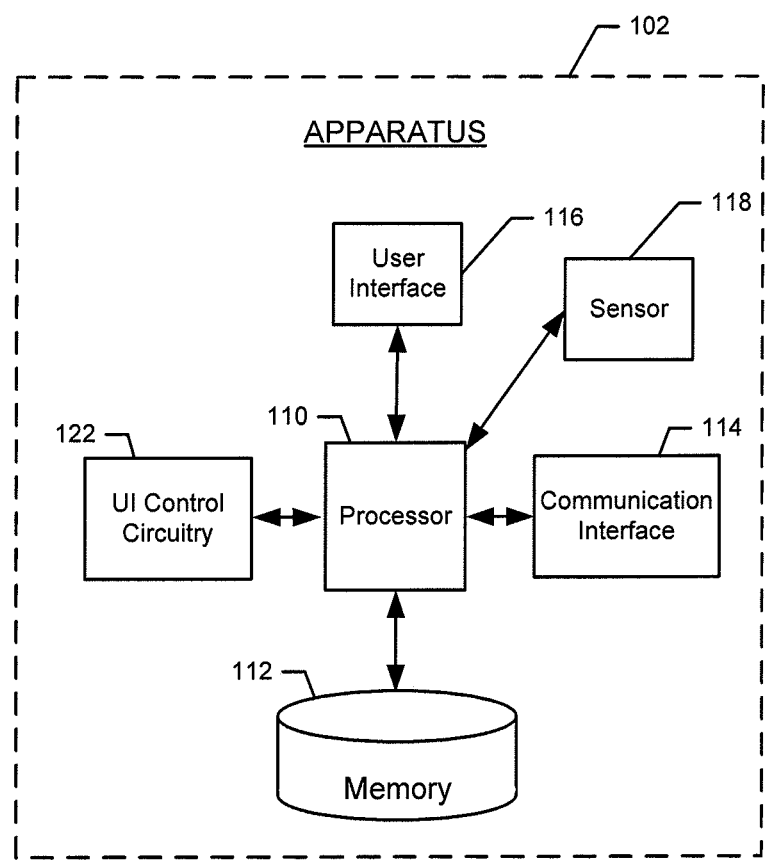
Figure 2:
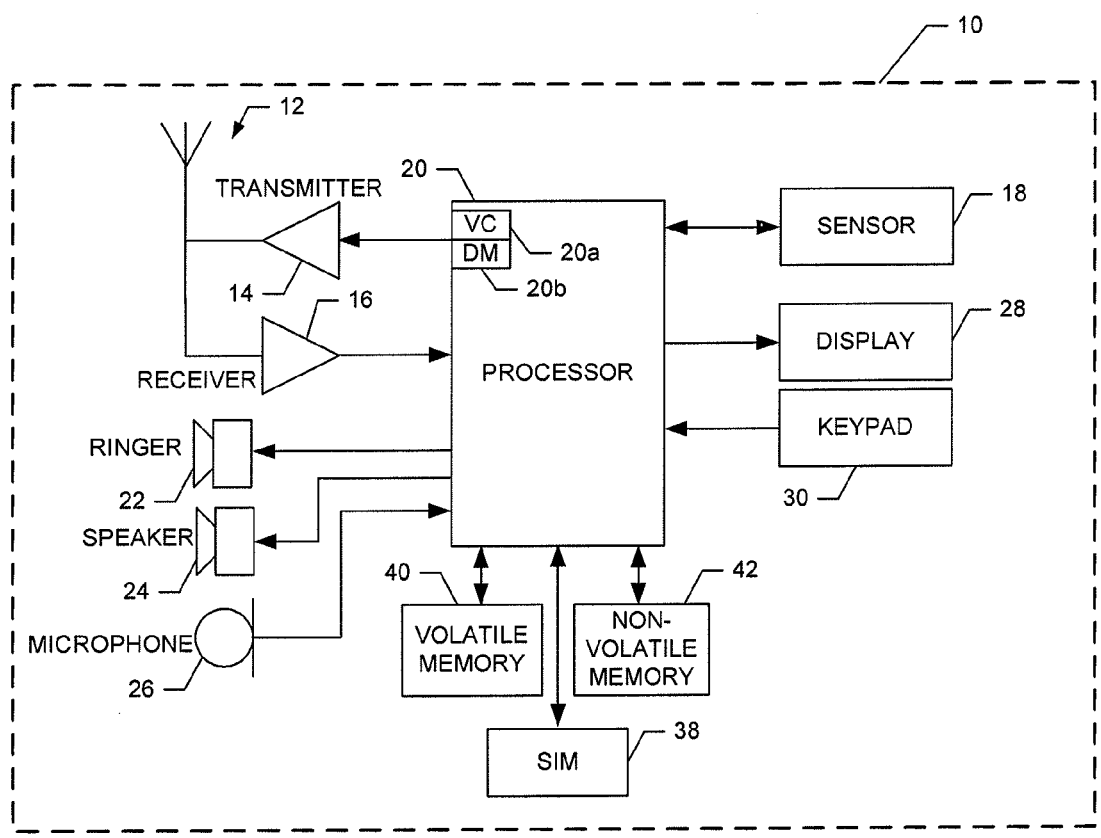
Figure 3:
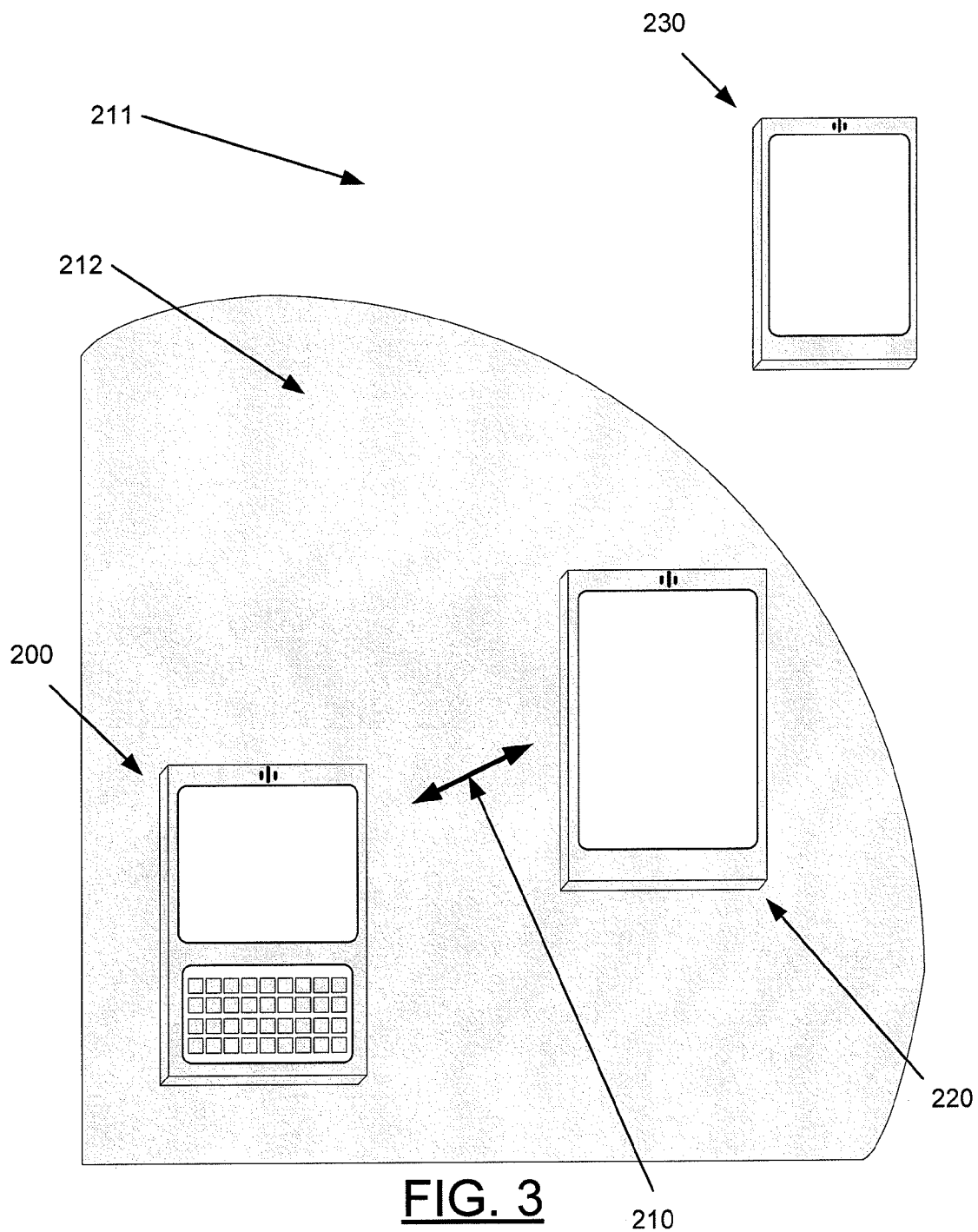
Figure 4A:
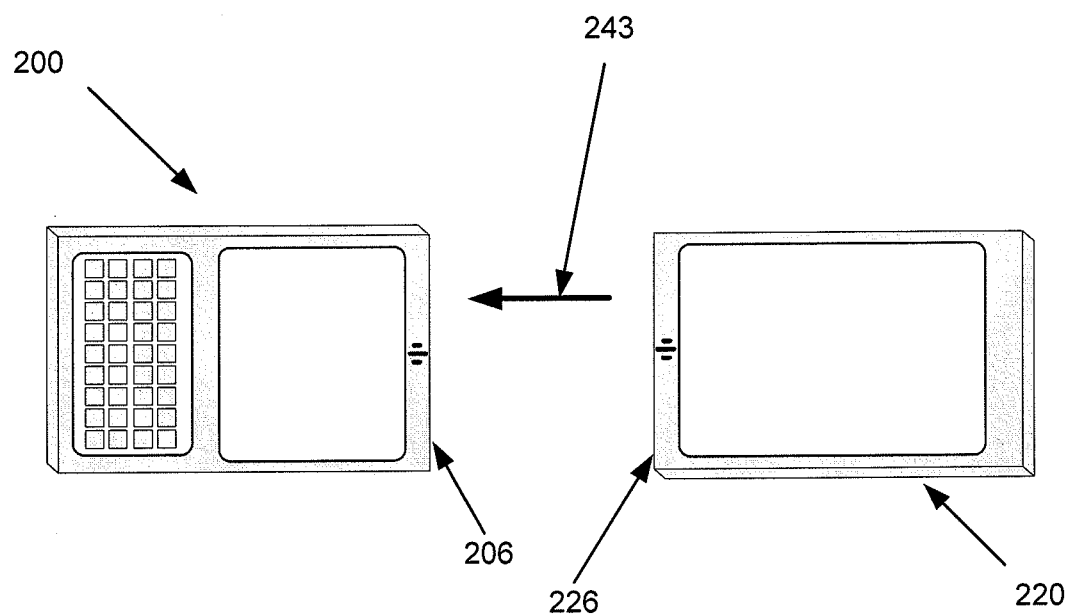
Figure 4B:
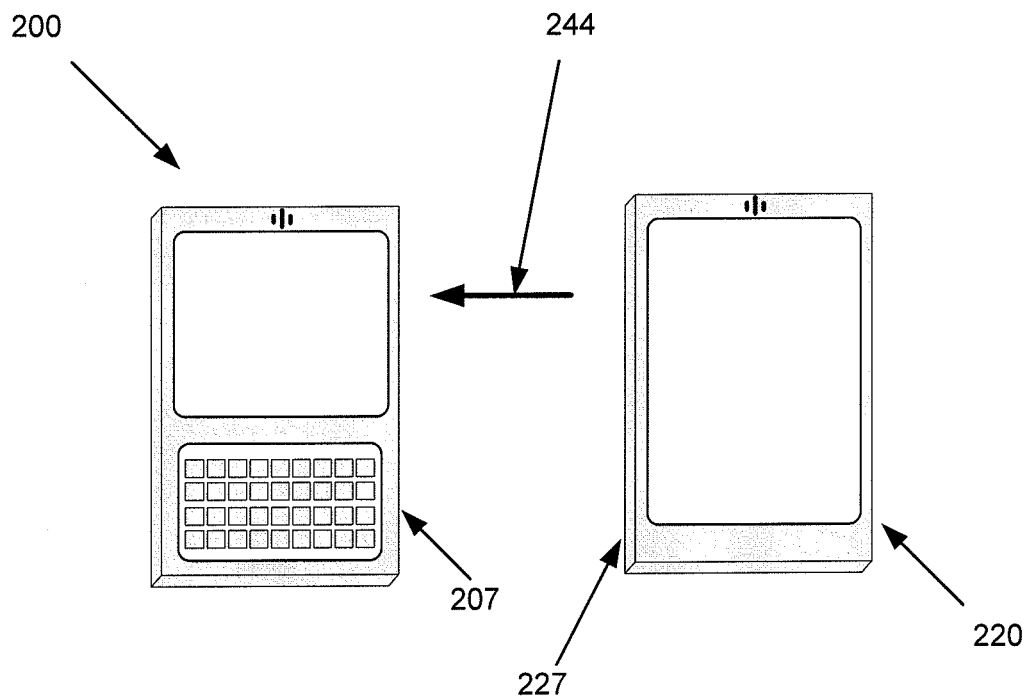
Figure 4C:
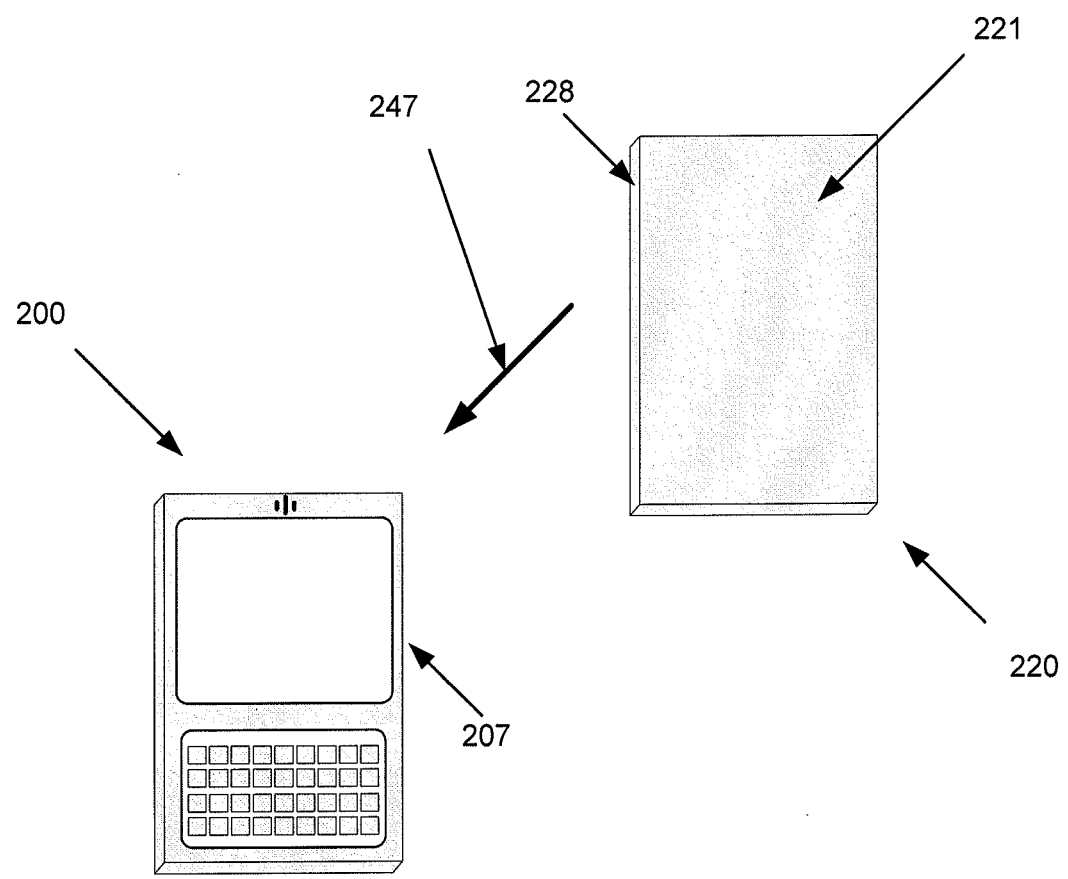
Figure 5:
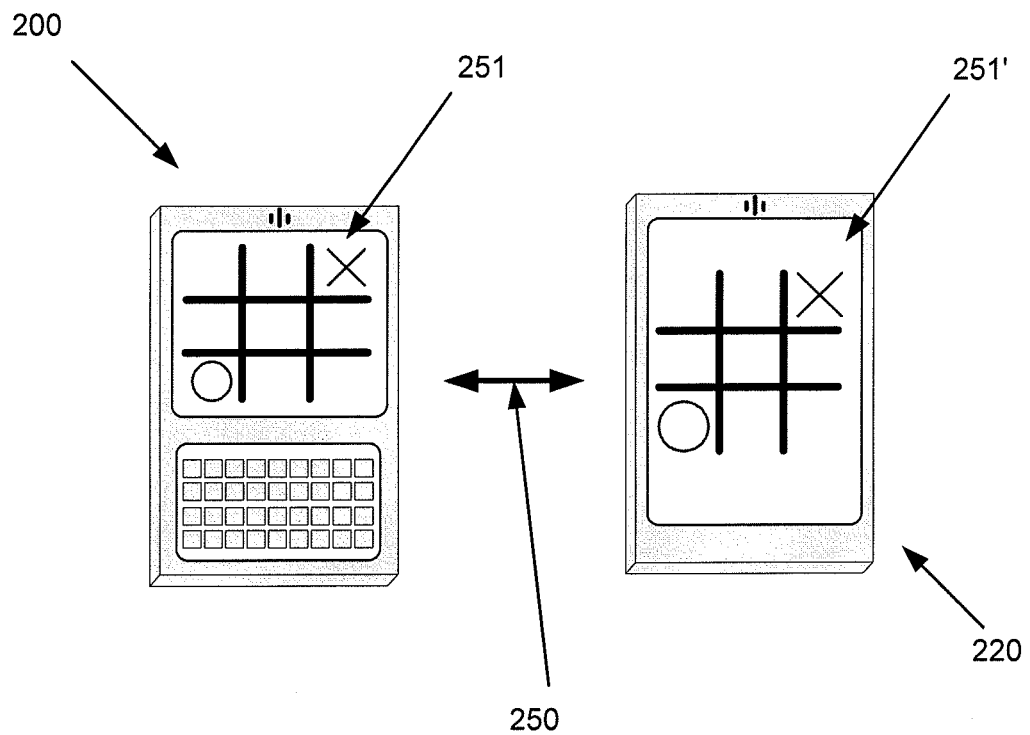
Figure 6:
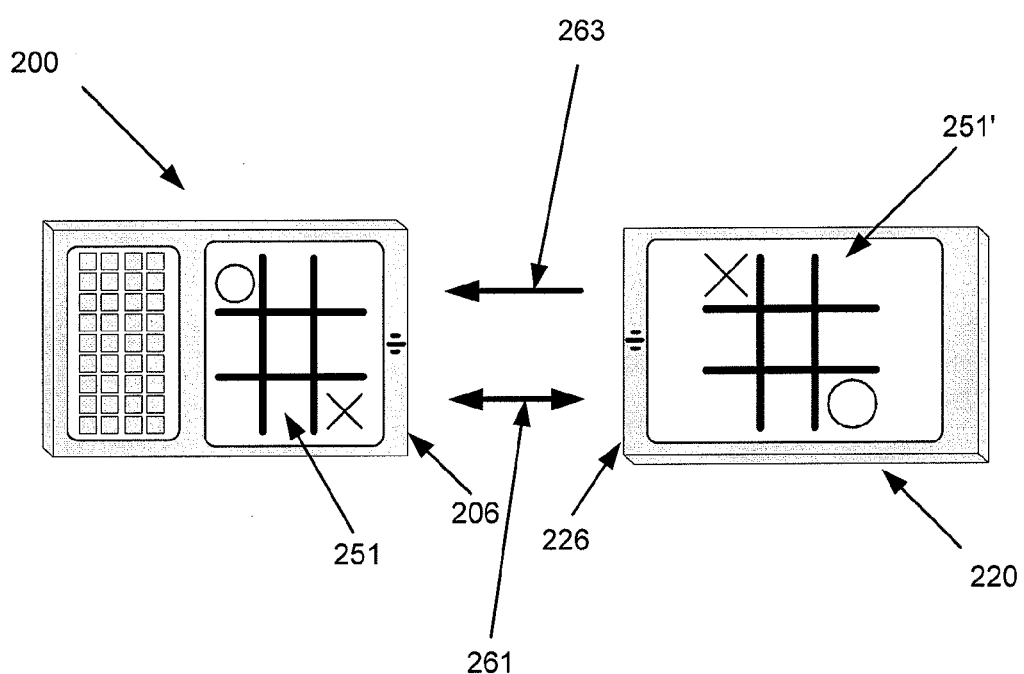
Figure 7A:
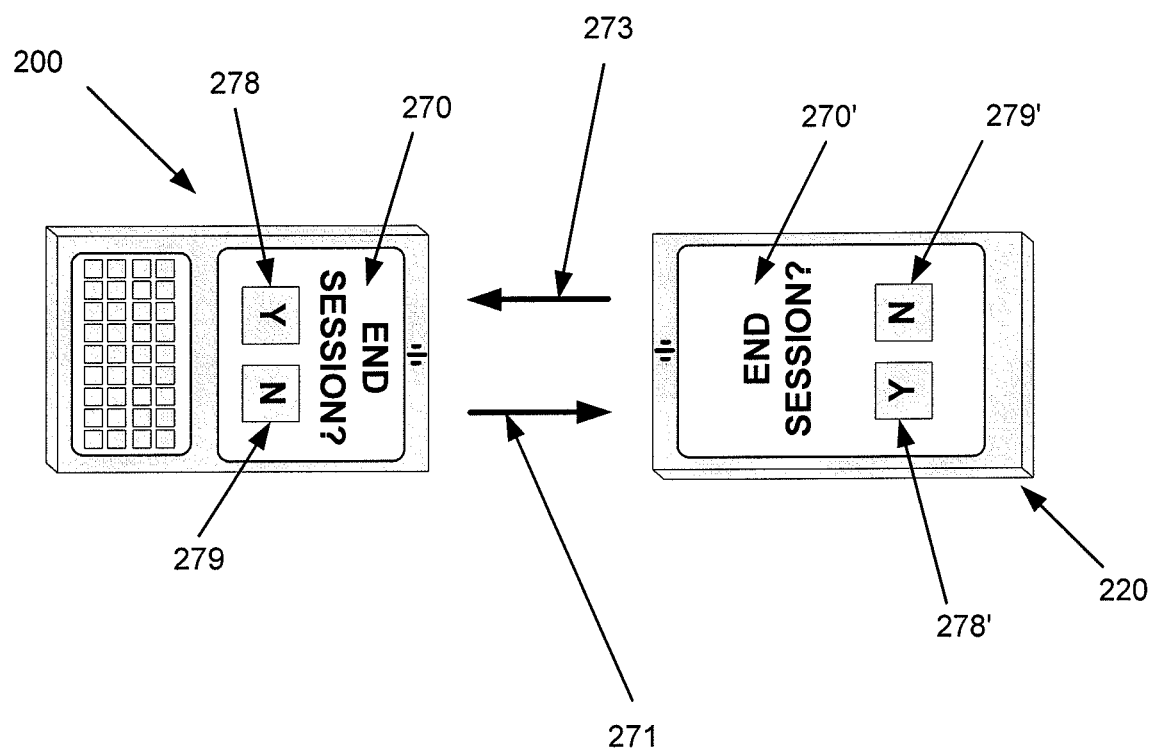
Figure 7B:
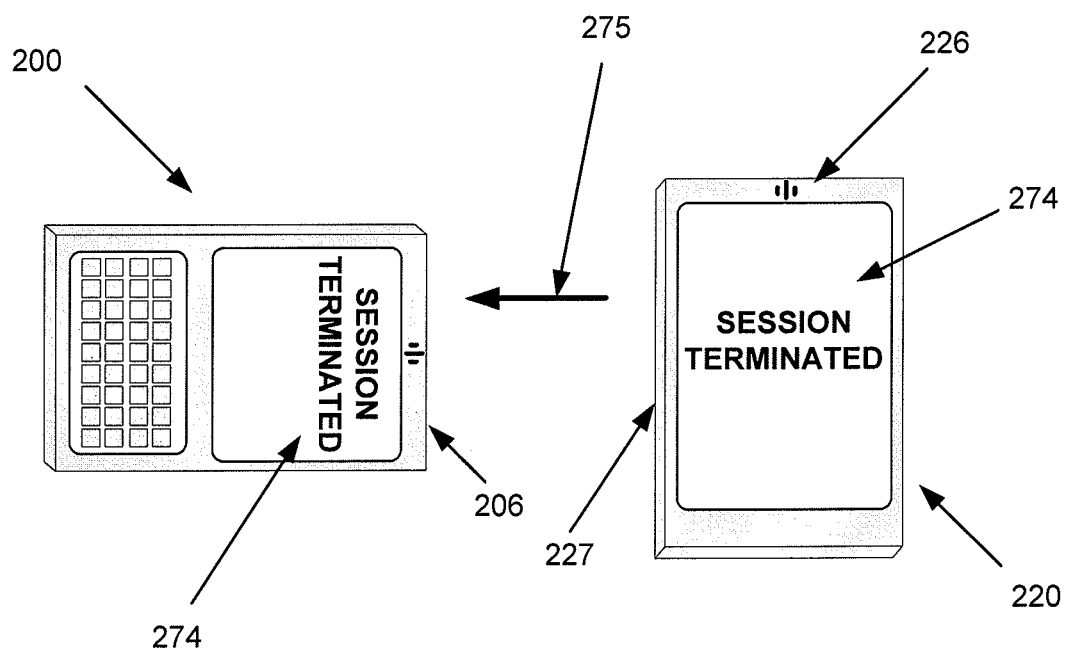
Figure 7C:
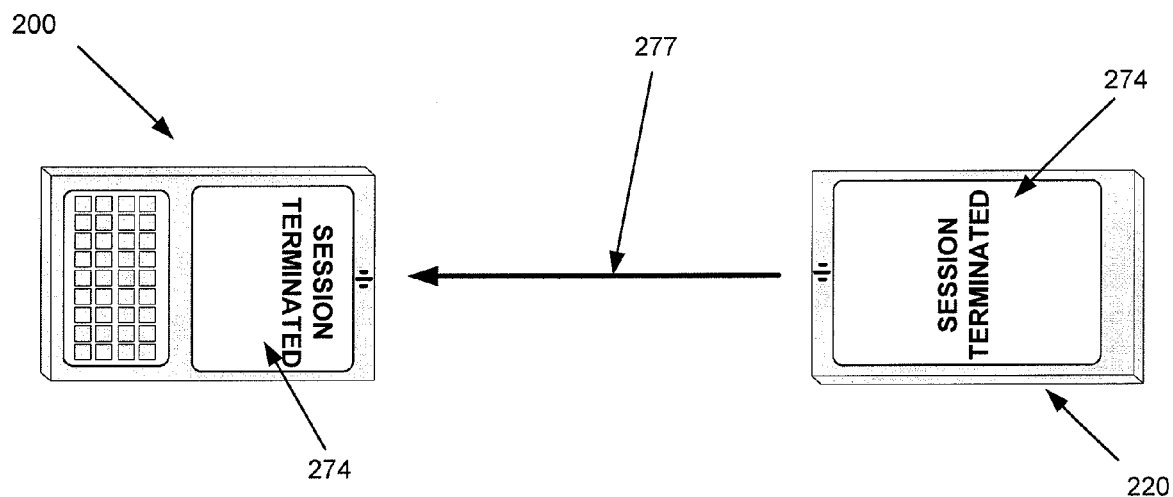
Figure 8A:
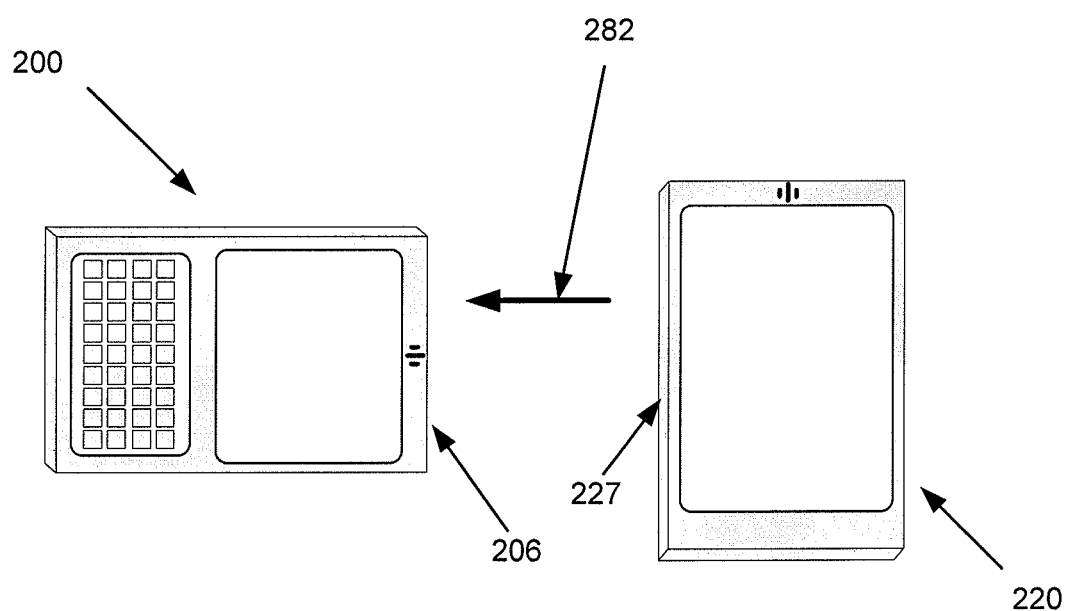
Figure 8B:
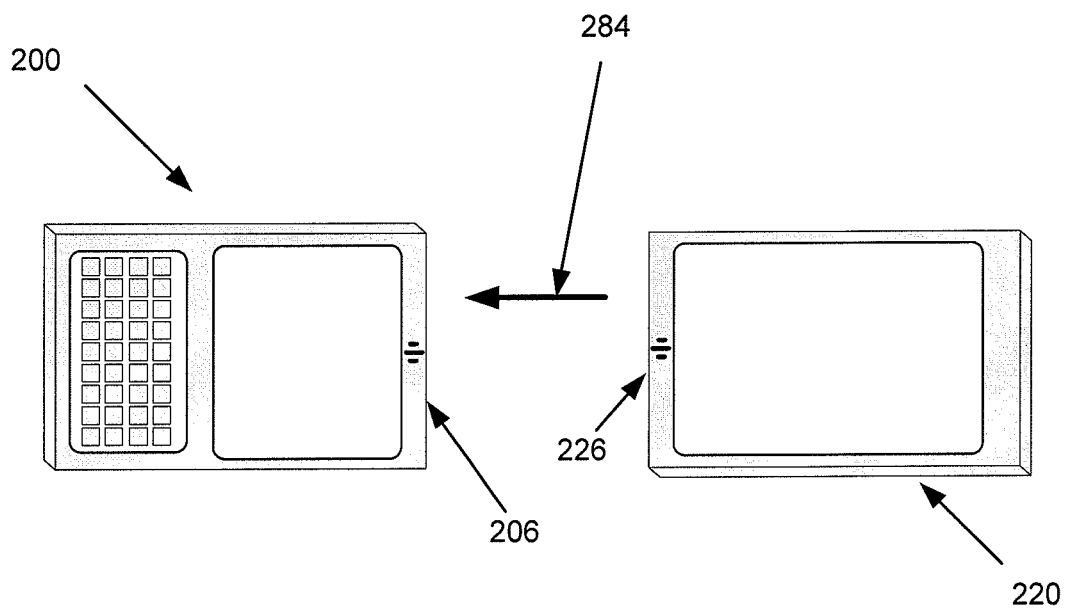
Figure 8C:
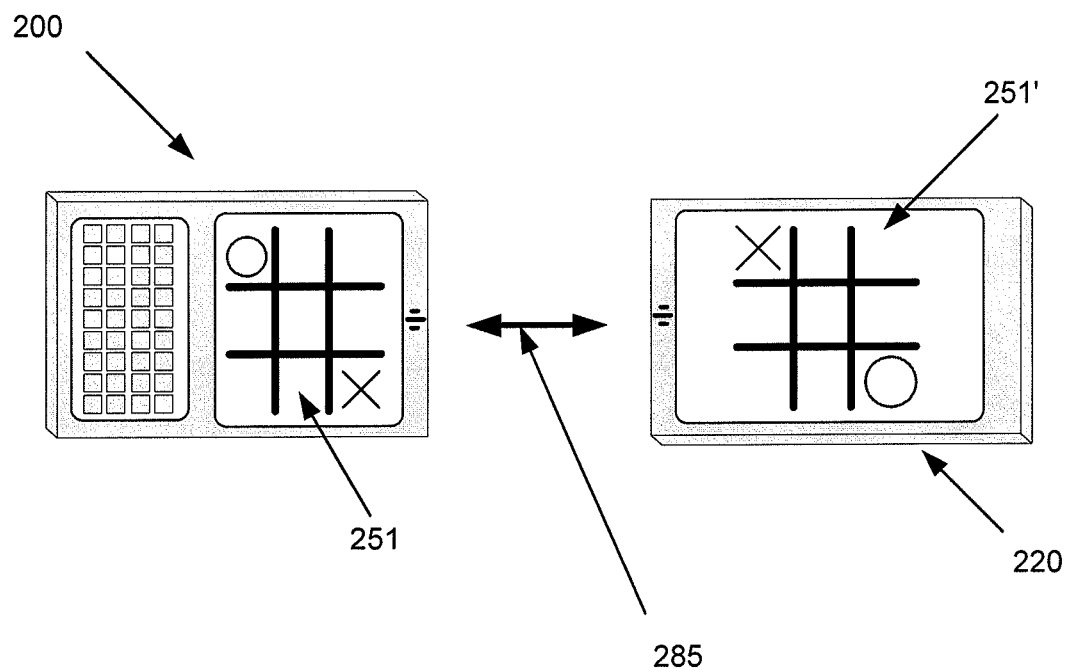
Figure 8D:
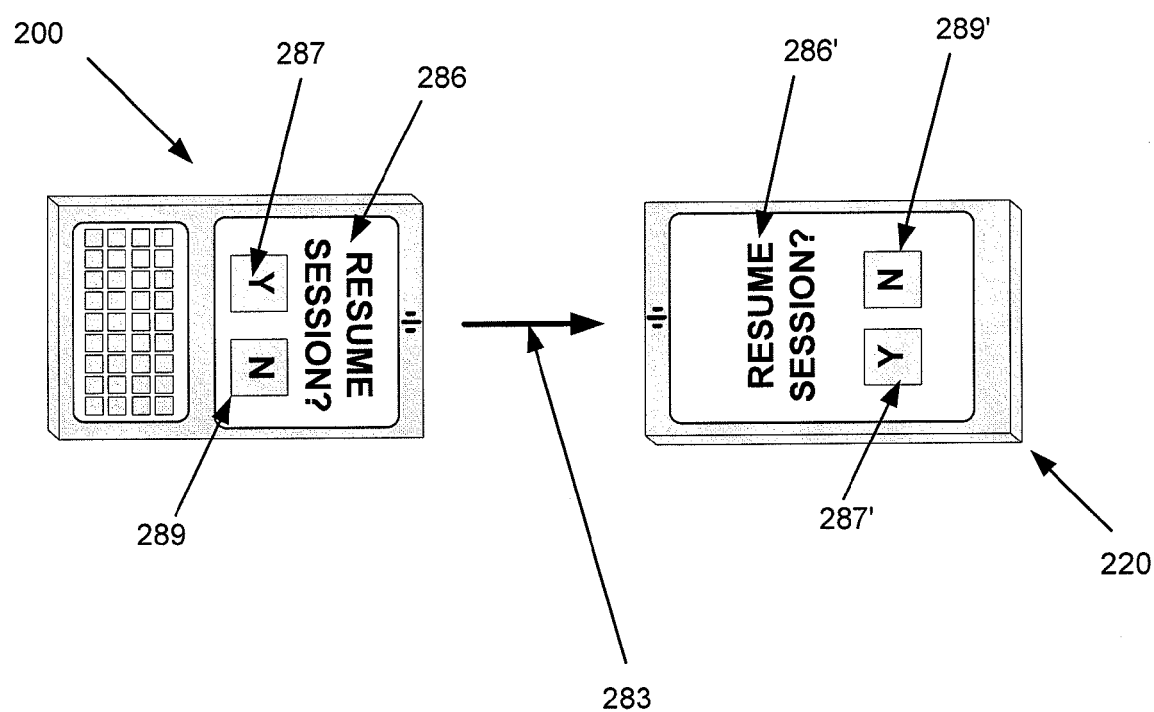
Figure 8E:
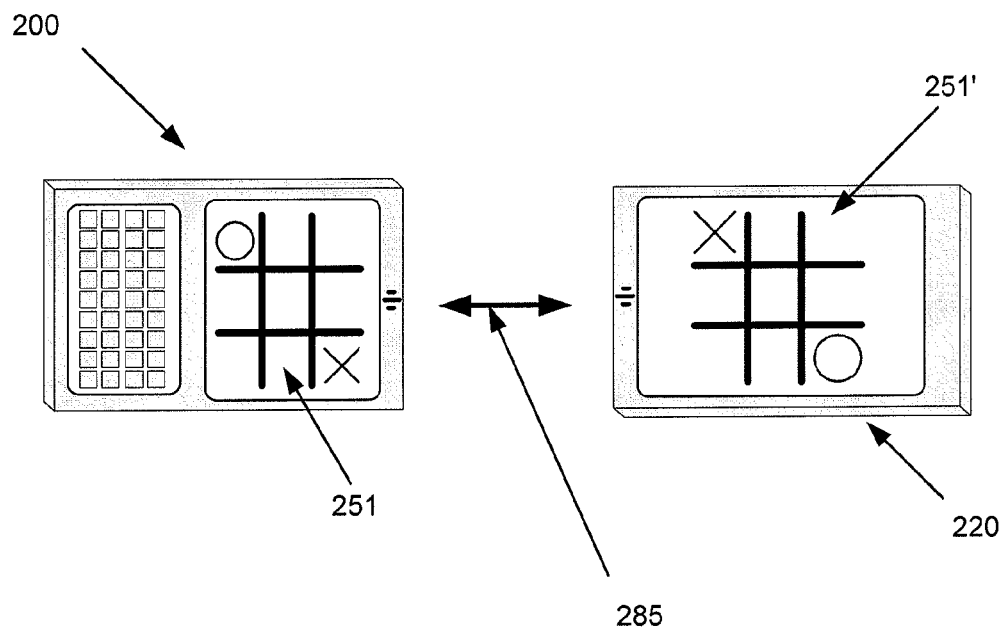
Figure 8F:
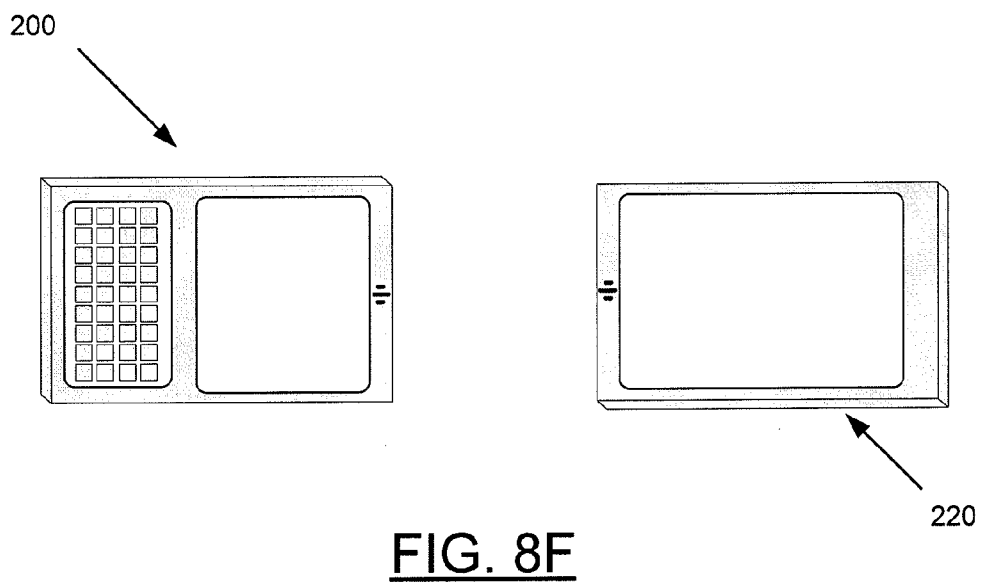
Figure 9:
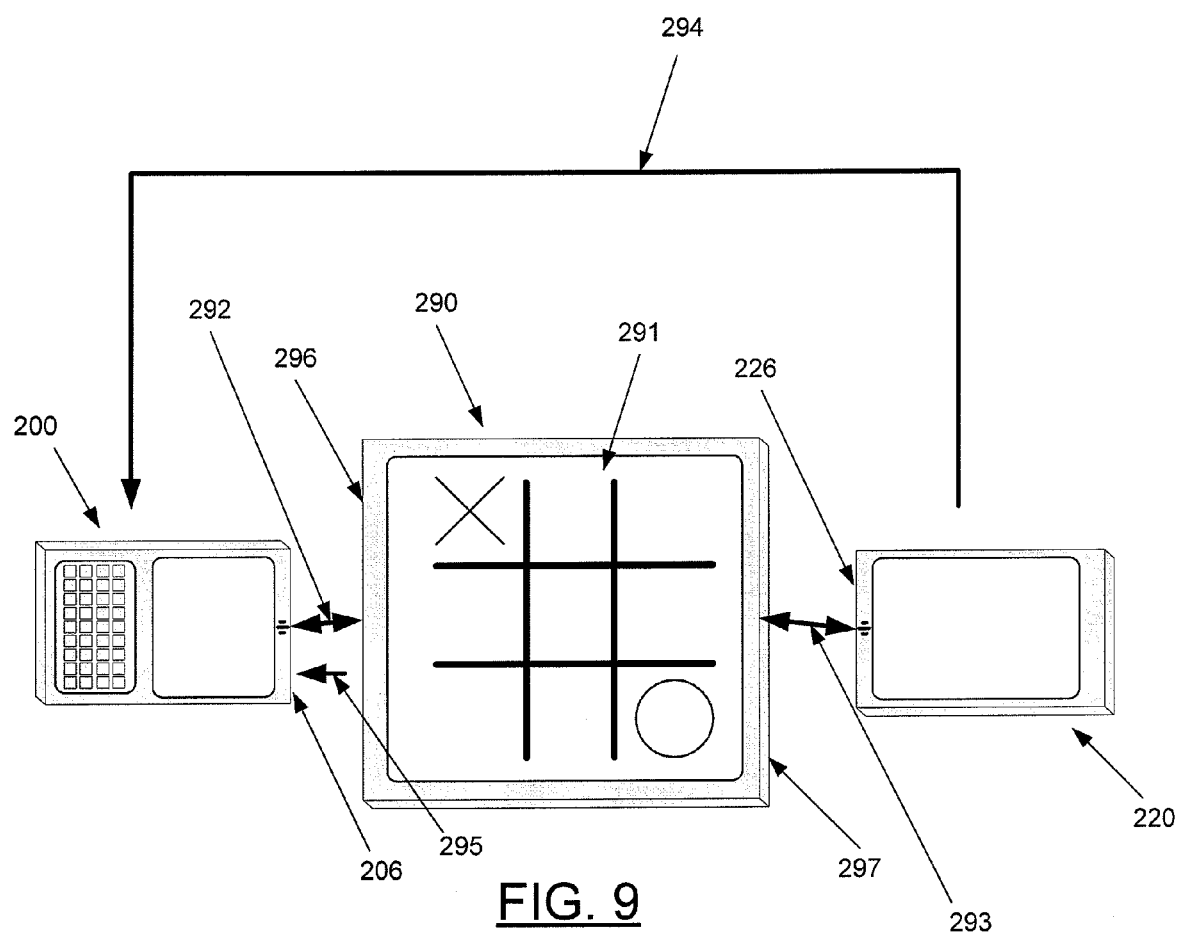
Figure 10:
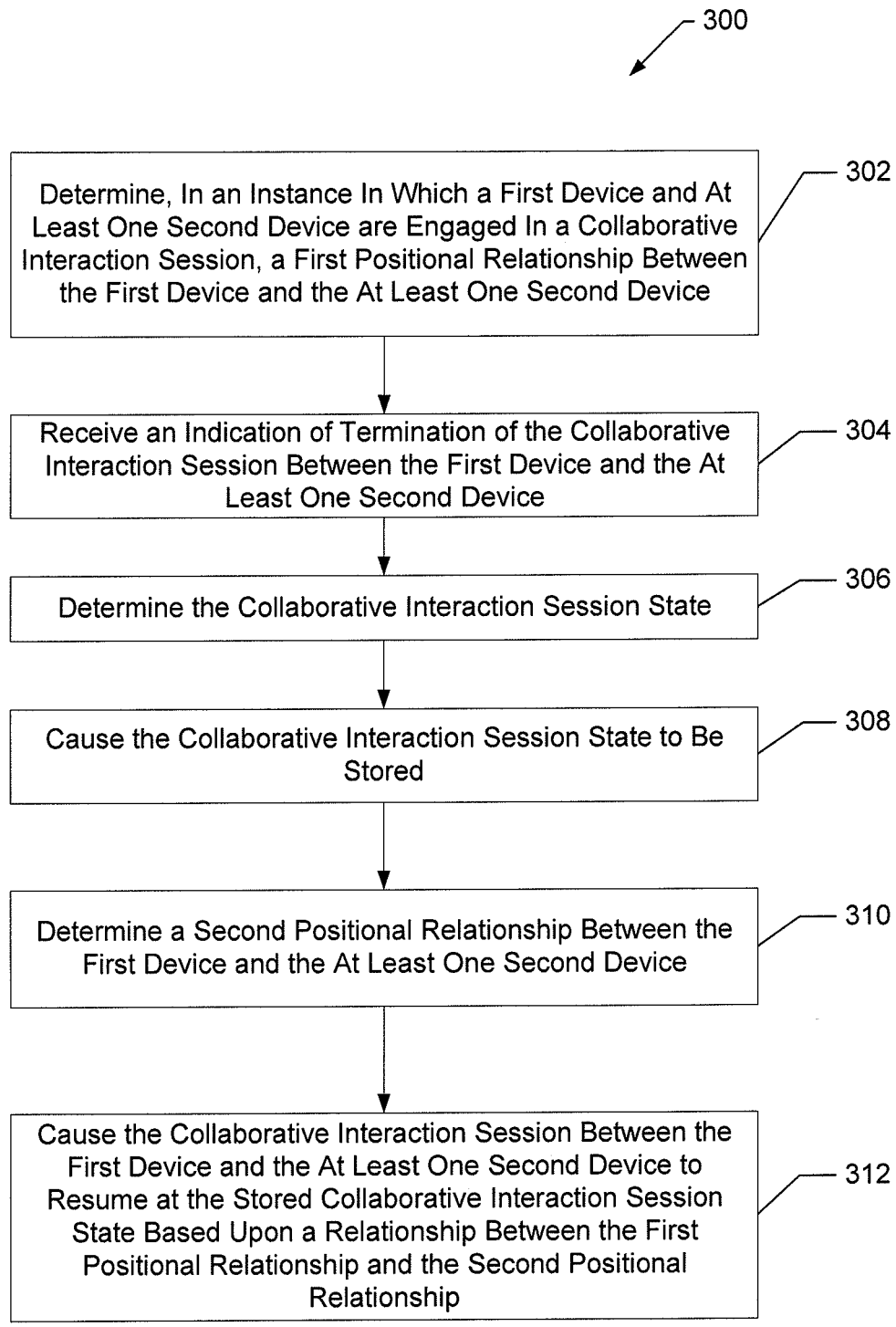
Figure 11:
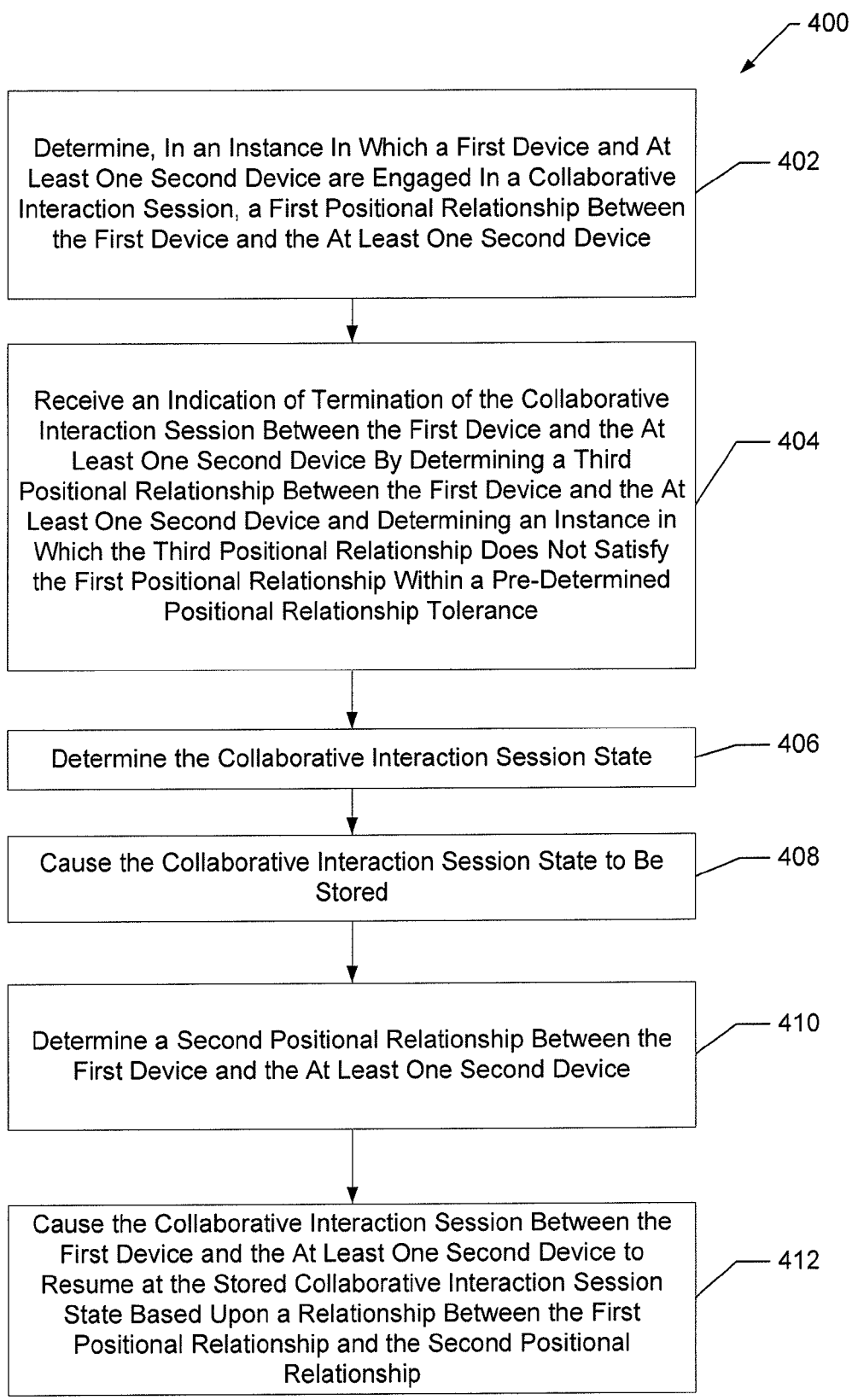

Having thus described some embodiments of the invention in general terms, reference will now be made to the accompanying drawings, which are not necessarily drawn to scale, and wherein:

FIG. 1 illustrates a block diagram of an apparatus with function capabilities for saving and resuming a state of a collaborative interaction session between devices based on the positional relationship of the devices with respect to each other according to an example embodiment of the present invention;

FIG. 2 is a schematic block diagram of a mobile terminal according to an example embodiment of the present invention;

FIG. 3 illustrates an example environment of a first device that may embody, for example, the apparatus shown in FIG. 1, wherein a second device and a third device are positioned relative to the first device, in accordance with an example embodiment of the present invention described herein;

FIGS. 4A-4C illustrate example positional relationships between a first device and a second device, in accordance with an example embodiment of the present invention described herein;

FIG. 5 illustrates an example collaborative interaction session between a first device and a second device, in accordance with an example embodiment of the present invention described herein;

FIG. 6 illustrates an example positional relationship for a first device and a second device engaged in a collaborative interaction session, in accordance with an example embodiment of the present invention described herein;

FIG. 7A-7C illustrate example indications of termination of the collaborative interaction session shown in FIG. 6, in accordance with an example embodiment of the present invention described herein;

FIG. 8A illustrates another example positional relationship between the first device and second device shown in FIG. 6, in accordance with an example embodiment of the present invention described herein;

FIG. 8B illustrates a positional relationship between the first device and second device that is similar to the positional relationship shown in FIG. 6, in accordance with an example embodiment of the present invention described herein;

FIG. 8C illustrates resumption of the collaborative interaction session shown in FIG. 6, in accordance with an example embodiment of the present invention described herein;

FIG. 8D illustrates a user being prompted as to whether they would like to resume the collaborative interaction session shown FIG. 6, in accordance with an example embodiment of the present invention described herein;

FIG. 8E illustrates resumption of the collaborative interaction session in response to the user selecting to resume the collaborative interaction session in FIG. 8D, in accordance with an example embodiment of the present invention described herein;

FIG. 8F illustrates that the collaborative interaction session has not been resumed in response to the user selecting not to resume the collaborative interaction session in FIG. 8D, in accordance with an example embodiment of the present invention described herein;

FIG. 9 illustrates another example collaborative interaction session between a first device, a second device, and a third device, in accordance with an example embodiment of the present invention described herein;

FIG. 10 illustrates a flowchart according to an example method for saving and resuming a state of a collaborative interaction between devices based on the orientation of the devices with respect to each other, in accordance with an example embodiment of the present invention described herein; and FIG. 11 illustrates a flowchart according to another example method for saving and resuming a state of a collaborative interaction between devices based on the orientation of the devices with respect to each other, in accordance with example embodiments of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for saving and resuming a state of a collaborative interaction session between devices based on the positional relationship of the devices with respect to each other according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, sensor 18, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, sensor 18, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The sensor 118 may be in communication with the processor 110 and/or UI control circuitry 122. The sensor 118 may be configured to sense and/or detect input. In embodiments wherein the apparatus 102 is embodied as a mobile terminal 10, the sensor 118 may be embodied as or comprise the sensor 18 (shown in FIG. 2). In some embodiments, the processor 110 and/or UI control circuitry 122 may be configured to receive input from the sensor 118 and determine that at least one other apparatus (e.g., a second device) is proximate the apparatus 102. In some embodiments, the processor 110 and/or UI control circuitry 122 may be configured to receive input from the sensor 118 and determine the orientation of at least one other apparatus (e.g., a second device) relative to the apparatus 102. In some embodiments, the sensor 118 may comprise a proximity sensor and/or light sensor. Still further, the sensor 118 may include an orientation sensor, such as a gyroscope, a compass or the like, for determining the relative orientation of the apparatus 102 or the device embodying the apparatus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch-screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102 may be configured to determine the relative position of other devices. In some embodiments, the apparatus 102 may be configured to determine an instance in which at least one other device is positioned proximate to the apparatus 102. For example, in some embodiments, the apparatus 102 may be configured to receive an indication that at least one other device is proximate the apparatus 102. In this regard, the apparatus 102 may be configured to transmit signals to and/or receive signals from other devices, such as through a proximity-based communications, e.g., Wi-Fi, NFC, BlueTooth, Wi-MAX, etc. In such a manner, the apparatus 102 may be configured to recognize the proximate nature of other devices based on the ability to transmit signals to and/or receive signals from the other devices, such as by recognizing signals having a strength and/or a quality that satisfy respective thresholds as being proximate the apparatus.

In some embodiments, the apparatus 102 may be configured to determine relative distance of the other devices. For example, the apparatus 102 may be configured to determine the distance between the first device embodying the apparatus 102 and the other devices based on characteristics of the signal (e.g., time traveled, signal strength, signal quality, etc.) with distances less than a predefined threshold being considered proximate one another. In some embodiments, each other device may transmit a position signal to the apparatus 102. The position signal may provide the specific location of the other device such that the apparatus 102 may determine the relative position of the other device with the other device being considered proximate in instances in which the relative position satisfies a predefined positional relationship. Additionally or alternatively, the apparatus 102 may be configured to sense the presence of another device, such as through a sensor (e.g., sensor 118), with another device being considered proximate if the presence of the other device is sensed. While certain embodiments of techniques for determining the proximity of devices are described, other techniques may be employed by other embodiments of the present invention.

In some embodiments, the apparatus 102 may be configured to receive an indication that a second device is proximate. For example, with reference to FIG. 3, a first device 200 may embody the apparatus 102 and be configured to receive an indication that a second device 220 is proximate. As noted above, in some embodiments, the indication may come from a signal (e.g., signal 210) transmitted and received between the first device 200 and the second device 220. In some embodiments, the determination as to whether a device is proximate may be based on the ability of the first device 200 to receive the signal 210 from the second device 220. In such a manner, a third device 230 may be positioned too far away for a similar signal to be transmitted and received between the first device 200 and the third device 230. Thus, an area 212 (e.g., a relative radius extending from the first device 200) may be defined such that a device (e.g., the second device 220) within the area 212 may be considered proximate and a device (e.g., the third device 230) outside the area 212 (e.g., in area 211) may not be considered proximate. Additionally or alternatively, as noted above, in some embodiments, the determination as to whether a device is proximate to the apparatus 102 may be based on a pre-defined distance (e.g., 5 ft., 6 in., etc.) and/or signal strength.

In some embodiments, the apparatus 102 may be configured to determine the orientation of other devices. In some embodiments, the apparatus 102 may be configured to determine the orientation of a first device relative to the second device. Additionally or alternatively, in some embodiments, the apparatus 102 may be configured to determine the orientation of at least one second device relative to the first device. In particular, similar to determining the proximity of nearby devices, the apparatus 102 may be configured to receive position and/or orientation information from another device and determine the orientation of the first device and/or second device based on that information. For example, with reference to FIG. 4A, a first device 200 may receive a signal (e.g., signal 243) from a second device 220 that indicates the relative position of the second device 220 with respect to the first device 200. Then, based on the relative position of the second device 220, the first device 200 may determine its orientation with respect to the second device 220. For instance, the first device 200 may determine that it is oriented with its front edge 206 facing the second device 220. Additionally, in some embodiments, the signal 243 may indicate the orientation of the second device 220 with respect to the first device 200. In such a manner, the first device 200 may determine that the second device 220 is oriented with its front edge 226 facing the first device 200 as well. While the first and second devices may determine their relative orientation in various manners, each device may determine its orientation relative to fixed location, such as relative to the north pole or relative to the gravitational pull, and the apparatus 102 may, in turn, compare the orientations of the first and second devices to determine the relative orientation therebetween.

Though the above examples include one signal being sent between the first device and the second device, embodiments of the present invention may be utilized with any indication of orientation and/or position, and are not meant to be limited to transmission and receipt of signals directly between the first and second device. For example, in some embodiments, a first signal may be transmitted from the first device to the second device that requests position and/or orientation information from the second device.

Though some example embodiments used herein may describe the apparatus 102 being configured as the first device, in other embodiments, the apparatus 102 may not be the first device. In such embodiments, the apparatus 102 may be embodied by a third device (e.g., a server or other network entity) that determines the position and/or orientation of a separate first device with respect to a separate second device. For example, the first device and second device may each determine contextual information, such as any type of sensed features (e.g., position, location, orientation with respect to a fixed object, etc.). Then each of the first device and second device may transmit the contextual information to a third device (e.g., server). The third device may determine the position and/or orientation of the first device and second device with respect to one another.

In some embodiments, each of the devices may be configured to include an embodiment of apparatus 102 described herein. However, though each device may encompass embodiments of apparatus 102, each device may be separately identifiable. For instance, in some embodiments, each device may be configured with a unique identifier. In such embodiments, the device may be configured to transmit the identifier to other devices to aid in recognition of the unique device. In such a regard, the apparatus 102 may be configured to determine the identity of each device.

In some embodiments, the apparatus 102 is configured to determine a positional relationship between a first device and at least one second device. The positional relationship between two devices may be based on any aspect of the relationship between the two devices. In some embodiments, the positional relationship may be based at least in part on the orientation of the first device relative to the second device. In some embodiments, the positional relationship may be based at least in part on the orientation of the second device relative to the first device. In some embodiments, the positional relationship may be based at least in part on the proximity of the second device to the first device.

FIG. 4A illustrates an example positional relationship between a first device 200 and second device 220. In particular, the front edge 206 of the first device 200 is positioned to face the front edge 226 of the second device 220. In order to determine the positional relationship, the first device 200 may receive a signal 243 from the second device 220 that details the relative position of the second device 220 (e.g., in front of the first device). Then, the first device 200 may determine that its front edge 206 is facing the second device 220, thereby determining a positional relationship of the front edge 206 of the first device 200 facing the second device 220.

In embodiments in which the positional relationship is also based on the orientation of the second device with respect to the first device, the signal 243 may also indicate the orientation of the second device 220 (e.g., the front edge 226 of the second device 220 is facing the first device 200). In such a circumstance, the first device 200 may determine a positional relationship of the front edge 206 of the first device 200 facing the front edge 226 of the second device 220.

In embodiments in which the positional relationship is also based on the proximity of the second device with respect to the first device, the signal 243 may also indicate the position of the second device 220 such that the first device 200 may determine the proximity of the second device 220. In such a circumstance, the first device 200 may further determine the positional relationship to include an element of proximity, such that the first device 200 and second device 220 are within a certain distance of each other (e.g., 6 in.).

In some embodiments, the specific identity of the devices may be utilized in distinguishing other devices. As such, the signal 243 may include an identifier of the second device 220, such that the first device 200 may recognize the second device 220 for which the determined positional relationship is established.

As noted above, some embodiments of the present invention contemplate other types of positional relationships. For example, FIG. 4B illustrates a first device 200 positioned to the left of a second device 220. In such a circumstance, the first device 200 may receive a signal 244 from the second device 220 that indicates that the left side 227 of the second device 220 faces the first device 200. Additionally, based on the signal 244, the first device 200 may determine that its right side 207 faces the second device 220. Thus, depending upon the level of detail for determination of the positional relationship, the first device 200 may determine a positional relationship of the right side 207 of the first device 200 facing the left side 227 of the second device 220.

FIG. 4C illustrates another example positional relationship with the first device 200 positioned downwardly and to the left of a second device 220. In such a circumstance, the first device 200 may receive a signal 247 from the second device 220 that indicates that the right side 228 of the second device 220 faces the first device 200. However, the signal 247 may also indicate that the second device 220 is facing upside down with respect to the first device 200 (e.g., the back 221 of the second device 220 may be facing upwardly from the ground). Additionally, based on the signal 247, the first device 200 may determine that its right side 207 generally faces toward the second device 220. Thus, depending upon the level of detail for determination of the positional relationship, the first device 200 may determine a positional relationship of the right side 207 of the first device 200 generally facing the right side 228 of the second device 220, the second device 220 being flipped upside down, and the second device 200 being positioned upwardly and to the right of the first device 200.

Devices, such as apparatus 102, are often capable of interacting with each other. Some interaction enables the devices to collaborate, or work together, for a certain operation. This type of interaction can be defined within an application or other operation such that the devices involved are engaged in a collaborative interaction session. As such, in some embodiments, the apparatus 102 may engage in a collaborative interaction session with another device. FIG. 5 illustrates an example collaborative interaction session between a first device 200 and a second device 220. As shown, the first device 200 and second device 220 may be in communication with each other, such as through signal 250. In such a manner, both the first device 200 and the second device 220 may be engaged in a collaborative interaction session (e.g., a game of tic-tac-toe). For example, in the depicted embodiment, the first device 200 displays a tic-tac-toe board 251 with an "X" in the upper right corner spot and an "O" in the lower left corner spot. Likewise, the second device 220 displays a tic-tac-toe board 251' with an "X" in the upper right corner spot and an "O" in the lower left corner spot. As each player takes their turn in the game of tic-tac-toe an "X" or an "O" will be placed on the tic-tac-toe board. The "X" or "O" will correspondingly be displayed on both board 251 for the first device 200 and board 251' for the second device 220.

In some embodiments, the apparatus 102 may be configured to determine the current state of the collaborative interaction session. In particular, as the collaborative interaction session progresses, the state of the session will change. For example, with reference to FIG. 5, if a first device 200 and second device 220 are engaged in a game of tic-tac-toe, the game will progress with each placement of an "X" or an "O". Thus, once a player positions an "X" in an open spot on the tic-tac-toe board 251, 251', the state of the collaborative interaction will change (e.g., there will be two "Xs" and one "O", as opposed to the state shown in FIG. 5 of one "X" and one "O").

In some embodiments, the apparatus 102 is configured to cause the current state of the collaborative interaction state to be saved. In some embodiments, the apparatus 102 may be configured to save/store the current state of the collaborative interaction session to the memory 112. Further, in some embodiments, the apparatus 102 may be configured to resume the stored state of the collaborative interaction session. In such a manner, the collaborative interaction session state may be resumed by the users of the first device 200 and second device 220 in FIG. 5 at a later time.

Collaborative interaction sessions may often be complex and/or time consuming. In this regard, the participants may wish to pause the collaborative interaction session and finish it at a later time. However, there may be a long process involved in resuming the saved stated of a collaborative interaction session between devices. As such, some embodiments of the present invention seek to provide an efficient way to resume a saved state of a collaborative interaction session based on the positional relationship of the involved devices.

In some embodiments, the apparatus 102 is configured to determine a first positional relationship in an instance in which a first device and at least one second device are engaged in a collaborative interaction session. The positional relationship may be based on any number of aspects related to the position and/or orientation of the devices with respect to each other. Some example aspects may include, but are not limited to, the orientation of the first device relative to the second device, the orientation of the second device relative to the first device, and the proximity of the first device to the second device.

The first positional relationship helps to define a relationship between the first device and second device that corresponds to the first and second devices being engaged in a collaborative interaction session. In particular, in some cases, if two devices are engaged in a collaborative interaction session, then they may be positioned and/or oriented in a particular way with respect to each other. For example, two devices of coworkers that are engaged in a collaborative interaction session may not normally be oriented with their front edges facing each other. However, the two devices may in fact be oriented with their front edges facing each other while the two devices are engaged in a collaborative interaction session. As such, some embodiments of the present invention seek to take advantage of a positional relationship between devices that may occur when the devices are engaged in a collaborative interaction session.

In some embodiments, the first positional relationship may be based at least in part on the orientation of the first device relative to the at least one second device. For example, with reference to FIG. 6, a first device 200 and second device 220 may be engaged in a collaborative interaction session 261. In the depicted embodiment, the first device 200 and the second device 220 are engaged in a session of tic-tac-toe, with the current state of the tic-tac-toe game being displayed as board 251 on the first device 200 and board 251' on the second device 220. The first device 200 may receive a signal 263 from the second device 220 indicating that the second device 220 is positioned in front of the first device 200. The first device 200 may determine its orientation relative to the second device 220 as its front edge 206 facing the second device 220. As such, the first device 200 may determine a first positional relationship of its front edge 206 facing the second device 220.

In some embodiments, the apparatus 102 may also be configured to determine the first positional relationship based at least in part on the orientation of the second device relative to the first device. For example, with reference to FIG. 6, the first device 200 may receive an indication (e.g., signal 263) that the front edge 226 of the second device 220 is facing the first device 200. First, the first device 200 may determine its orientation relative to the second device 220 as its front edge 206 facing the second device 220. Next, the first device 200 may determine the orientation of the second device 220 relative to the first device 200 as the front edge 226 of the second device 220 facing the first device 200. Considering that, in this example, the first positional relationship may be based on both the orientation of the first device relative to the second device (e.g., the front edge 206 of the first device 200 facing the second device 220) and the orientation of the second device relative to the first device (e.g., the front edge 226 of the second device 220 facing the first device 200), the first device 200 may determine a first positional relationship of the front edge 206 of the first device 200 facing the front edge 226 of the second device 220.

In some embodiments, the apparatus 102 may also be configured to determine the first positional relationship based at least in part on the proximity of the first device to the second device. For example, with reference to FIG. 6, the first device 200 may receive an indication (e.g., signal 263) of the position of the second device 220. From this indication of the position the first device 200 may determine that the second device 220 is a certain distance (e.g., 6 in.) away from the first device 200. Considering that, in this example, the first positional relationship may be based on both the orientation of the first device relative to the second device (e.g., the front edge 206 of the first device 200 facing the second device 220) and the proximity of the second device relative to the first device (e.g., the second device 220 is a certain distance away from the first device 200), the first device 200 may determine a first positional relationship of the front edge 206 of the first device 200 facing the second device 220 and the second device 220 being a certain distance away from the first device 200 (e.g., 6 in.).

Additionally, the apparatus 102 may also be configured to determine the first positional relationship based at least in part on the identity of the first device and the second device. For example, with reference to FIG. 6, the first device 200 may receive an indication (e.g., signal 263) of the identity of the second device 220. In such a regard, the first device 200 may also determine a first positional relationship based on the proper combination of devices (e.g., the unique first device 200 and the unique second device 220).

In some embodiments, the apparatus 102 may be configured to determine a predetermined positional relationship tolerance. In particular, in some embodiments, the first positional relationship may not be defined with particularly rigid boundaries and, thus, some embodiments of the present invention may desire to determine a first positional relationship that enables some room for error while still qualifying as the first positional relationship. For example, it may be desirable to allow the devices to shift slightly while remaining engaged in the collaborative interaction session. A predetermined positional relationship tolerance can be any determined amount of deviation from the positional relationship (e.g., tilt within a certain amount of degrees, move a certain distance away from each other, etc.). For example, with reference to FIG. 6, the first positional relationship may be determined such that the front edge 206 of the first device 200 faces the front edge 226 of the second device 220. However, a predetermined positional relationship tolerance may be determined to allow the front edge 206 of the first device 200 to be within 5 degrees of directly facing the second device 220. Similarly, the predetermined positional relationship tolerance may be determined to allow the front edge 226 of the second device 220 to be within 5 degrees of directly facing the first device 200. In such a manner, the first device 200 and/or second device 220 are not required to adhere to a rigid positional relationship during the collaborative interaction session, thereby allowing a factor of error in the positioning of each device.

Additionally, the first positional relationship may be determined based on proximity of the first device to the second device and, in some cases, the predetermined positional relationship tolerance may account for some slight changes in proximity. For example, with reference to FIG. 6, the first positional relationship may be determined such that the first device 200 is 6 inches from the second device 220. However, a predetermined positional relationship tolerance may be determined to allow the first device 200 and second device 220 to fluctuate up to 6 inches either toward each other or away from each other. In such a manner, the first device 200 and/or second device 220 are not required to adhere to a rigid positional relationship during the collaborative interaction session, thereby allowing a factor of error in the distance between each device.

In some embodiments, the apparatus 102 is configured to receive an indication of termination of the collaborative interaction session between the first device and the second device. In some embodiments, the first device and/or the second device may provide an indication that one of the users desires to end the current collaborative interaction session. For example, with reference to FIG. 7A, the first device 200 and second device 220 may be engaged in a collaborative interaction session, such as shown in FIG. 6. The user of the first device 200 or the user of the second device 220 may wish to end the collaborative interaction session. As such, they may engage a terminate session operation 270, 270' on the first device 200 and/or second device 220. For example, the terminate session operation 270, 270' may display "END SESSION?" on the display of the first device 200 and/or second device 220. Additionally, the user may be prompted with a selection as to whether to end the collaborative interaction session (e.g., input box "Y") or to continue the collaborative interaction session (e.g., input box "N"). Depending on the selection by the user, each device may receive an indication to either terminate or continue the collaborative interaction session (e.g., through signal 271 and/or signal 273). In such a regard, the first device 200 may receive an indication of the termination of the collaborative interaction session.

Additionally or alternatively, in some embodiments, the apparatus 102 may receive an indication of termination of the collaborative interaction session by determining that the first device and/or second device have moved out of the first positional relationship. For example, two users of devices may simply move their devices out of their current position (e.g., walk away) to terminate their collaborative interaction session. As such, the apparatus 102 may recognize the movement out of the first positional relationship as an indication of termination of the collaborative interaction session.

For example, in some embodiments, the apparatus 102 may be configured to determine a third positional relationship between the first device and the at least one second device. Such a third positional relationship may be based on any factors described herein when determining a positional relationship (e.g., orientation of each device relative to the other, proximity, identity, etc.). Additionally, in some embodiments, the apparatus 102 may be configured to compare the third positional relationship with the first positional relationship and determine an instance in which the third positional relationship does not satisfy the first positional relationship. In some embodiments, the apparatus 102 may be configured to determine an instance in which the third positional relationship does not satisfy the first positional relationship within a pre-determined positional relationship tolerance. In such a manner, the apparatus 102 may be configured to monitor the current positional relationship of the first and second device and determine when that positional relationship is different from the first positional relationship, thereby indicating that the first and second device have moved away from each other to terminate the collaborative interaction session.

For example, the first device 200 and second device 220 may be engaged in a collaborative interaction session as shown in FIG. 6. Additionally, as noted in an example above, the first device 200 may determine a first positional relationship of the front edge 206 of the first device 200 facing the front edge 226 of the second device 220. However, with reference to FIG. 7B, the second device 220 may rotate 90 degrees such that the left side 227 of the second device 220 is now facing the first device 200. The first device 200 may receive an indication (e.g., signal 275) of the new orientation of the second device 220 and determine that the current positional relationship of the first device 200 and second device 220 does not satisfy the first positional relationship, thereby indicating termination of the collaborative interaction session. In some embodiments, the first device 200 and second device 220 may also each display "SESSION TERMINATED" 274.

Moreover, the first device 200 may determine a predetermined positional relationship tolerance that allows the first device 200 and/or second device 220 to rotate within 5 degrees of facing each other. However, with reference to FIG. 7B, the second device 220 may rotate 90 degrees such that the left side 227 of the second device 220 is now facing the first device 200. The first device 200 may receive an indication (e.g., signal 275) of the new orientation of the second device 220 and determine that the current positional relationship of the first device 200 and second device 220 is outside the predetermined positional relationship tolerance of 5 degrees and, thus, does not satisfy the first positional relationship, which indicates termination of the collaborative interaction session. In some embodiments, the first device 200 and second device 220 may also each display "SESSION TERMINATED" 274.

Similarly, the first device 200 may have determined a first positional relationship that is based on proximity. For instance, as noted in an example above, the first device 200 may determine a first positional relationship such that the first device 200 is 6 inches from the second device 220. However, with reference to FIG. 7C, the second device 220 may move away from the first device 200 such that the second device 220 is now 2 feet away from the first device 200. The first device 200 may receive an indication (e.g., signal 277) of the new position of the second device 220 and determine that the current positional relationship of the first device 200 and second device 220 does not satisfy the first positional relationship, thereby indicating termination of the collaborative interaction session. In some embodiments, the first device 200 and second device 220 may also each display "SESSION TERMINATED" 274.

Additionally, the first device may determine a predetermined positional relationship tolerance that allows the first device 200 and second device 220 to fluctuate up to 6 inches either toward each other or away from each other. However, with reference to FIG. 7C, the second device 220 may move away from the first device 200 such that the second device 220 is now 2 feet away from the first device 200. The first device 200 may receive an indication (e.g., signal 277) of the new position of the second device 220 and determine that the current positional relationship of the first device 200 and second device 220 is outside the predetermined positional relationship tolerance of 6 inches and, thus, does not satisfy the first positional relationship, which indicates termination of the collaborative interaction session. In some embodiments, the first device 200 and second device 220 may also each display "SESSION TERMINATED" 274.

In some embodiments, the apparatus 102 may be configured to determine the collaborative interaction session state. In particular, in some embodiments, in response to receiving an indication of termination of the collaborative interaction session, the apparatus 102 may be configured to determine the last state of the collaborative interaction session. For example, once an indication of termination of the collaborative interaction session is received (e.g., FIG. 7a, 7B, or 7C), with reference to FIG. 6, the first device 200 may determine the state of the collaborative interaction session as a tic-tac-toe game with an "X" in the upper right corner and an "O" in the lower left corner of the tic-tac-toe board 251, 251'.

In some embodiments, the apparatus 102 may be configured to cause the collaborative interaction session state to be stored. In particular, in some embodiments, in response to receiving an indication of termination of the collaborative interaction session and determining the collaborative interaction state, the apparatus 102 may be configured to cause the collaborative interaction session state to be stored, thereby saving the last state of the collaborative interaction session for later use. For example, with reference to FIG. 6, once the first device 200 determines the state of the collaborative interaction session (e.g., a tic-tac-toe game with an "X" in the upper right corner and an "O" in the lower left corner of the tic-tac-toe board 251, 251'), that state can be stored in a memory (e.g., memory 112) for resumption at a later time.

Once the collaborative interaction session is terminated, the apparatus 102 may be configured to monitor the positional relationship between the first device and at least one second device. In some embodiments, the apparatus 102 may be configured to determine a second positional relationship between the first device and the at least one second device. Such a second positional relationship may be based on any factors described herein when determining a positional relationship (e.g., orientation of each device relative to the other, proximity, identity, etc.).

For example, with reference to FIG. 8A, the first device 200 may receive an indication (e.g., signal 282) of the position and/or orientation of the second device 220. In a similar manner to embodiments of the present invention described herein, the first device 200 may determine a second positional relationship of the front edge 206 of the first device 200 facing the left side 227 of the second device 220. In another example, with reference to FIG. 8B, the first device 200 may receive an indication (e.g., signal 284) of the position and/or orientation of the second device 220. In a similar manner to embodiments of the present invention described herein, the first device 200 may determine a second positional relationship of the front edge 206 of the first device 200 facing the front edge 226 of the second device 220. Additionally, as noted above, the first device 200 may determine a second positional relationship also based on proximity between the first device 200 and second device 220.

Monitoring the positional relationship of the first and second device may enable the apparatus 102 to determine when to resume a previous collaborative interaction session. Thus, in some embodiments, the apparatus 102 may be configured to compare the second positional relationship with the first positional relationship and determine a relationship between the second positional relationship and the first positional relationship. Then, the apparatus 102 may be configured to cause the collaborative interaction session between the first device and at least one second device to resume at the stored collaborative interaction session state based on the relationship between the first positional relationship and the second positional relationship.

In some embodiments, the apparatus 102 may be configured to cause the stored collaborative interaction session state to resume in an instance in which the second positional relationship satisfies the first positional relationship. Additionally, the apparatus 102 may be configured to determine the identification of the first device and/or second device to confirm that the same devices are being used for a specific collaborative interaction session. As such, embodiments of the present invention seek to resume a stored collaborative interaction session state when the first and second device enter a positional relationship that indicates a desire to resume the previous collaborative interaction session, such as returning the first and second device to the first positional relationship.

For example, with reference to FIG. 8A, the first device 200 may receive an indication (e.g., signal 282) of the position and/or orientation of the second device 220. The first device 200 may determine a second positional relationship of the front edge 206 of the first device 200 facing the left side 227 of the second device 220. Then, the first device 200 may compare the second positional relationship to a previously determined first positional relationship (e.g., the positional relationship shown in FIG. 6 and described above). However, the first device 200 may determine that the second positional relationship (e.g., shown in FIG. 8A) does not satisfy the first positional relationship (e.g., shown in FIG. 6). As such, the first device 200 may not cause the stored collaborative interaction session state to resume.

FIG. 8B illustrates another example positional relationship between the first device 200 and the second device 220. In the depicted embodiment, the first device 200 may receive an indication (e.g., signal 284) of the position and/or orientation of the second device 220. The first device 200 may determine a second positional relationship of the front edge 206 of the first device 200 facing the front edge 226 of the second device 220. Then, the first device 200 may compare the second positional relationship to a first positional relationship (e.g., the positional relationship shown in FIG. 6 and described above). Here, the first device 200 may determine that the second positional relationship (e.g., shown in FIG. 8B) satisfies the first positional relationship (e.g., shown in FIG. 6). As such, the first device 200 may cause the stored collaborative interaction session state to resume between the first device 200 and second device 220. Thus, with reference to FIG. 8C, the collaborative interaction session 285 may resume. As displayed on both the first device 200 and the second device 220, the tic-tac-toe game board 251, 251' will resume at the stored state of an "X" in the upper right corner spot and an "O" in the lower left corner spot.

In some embodiments, the apparatus 102 may be configured to cause the collaborative interaction session to resume at the stored collaborative interaction session state in an instance in which the second positional relationship satisfies the first positional relationship within a pre-determined positional relationship tolerance. For example, as is consistent with the above described examples with respect to FIG. 6, the first device and/or second device may move within 5 degrees of facing each other (e.g., the predetermined positional relationship tolerance) to cause the second positional relationship to satisfy the first positional relationship within the predetermined positional relationship tolerance. Similarly, in some embodiments, the first device and/or second device may move within 1 foot of each other (e.g., the predetermined positional relationship tolerance) to cause the second positional relationship to satisfy the first positional relationship within the predetermined positional relationship tolerance. In such a manner, the apparatus 102 may be configured to account for a factor of error in repositioning the devices for reinstating the collaborative interaction session. As such, a slight change in orientation and/or proximity may be accounted for while still enabling users to resume their stored collaborative interaction session state.

In some embodiments, the apparatus 102 may be configured to automatically cause the collaborative interaction session between the first device and at least one second device to resume at the stored collaborative interaction session state based on the relationship between the first positional relationship and the second positional relationship. In such a manner, no user input would be required to cause the collaborative interaction session to resume at the stored collaborative interaction session state. An example of an embodiment of the present invention that automatically causes resumption of the stored collaborative interaction session state is described above with respect to FIGS. 8B-8C.

In some embodiments, the apparatus 102 may be configured to cause a user of the first device or the at least one second device to be prompted as to whether the collaborative interaction session should be resumed at the stored collaborative interaction session state. In such embodiments, the apparatus 102 may be configured to cause the collaborative interaction session between the first device and the at least one second device to resume at the stored collaborative interaction session state in an instance in which the user indicates that the collaborative interaction session should be resumed at the stored collaborative interaction session state (e.g., in response to the prompt).

For example, as described above, FIG. 6 illustrates a first positional relationship that corresponds to a first device and a second device being engaged in a collaborative interaction session. Additionally, FIG. 6 illustrates an example stored collaborative interaction session state, such as in response to receiving an indication of termination of the collaborative interaction session (e.g., FIGS. 7A-7C). Moreover, FIG. 8B illustrates returning of the first device and second device to a second positional relationship that satisfies the first positional relationship of FIG. 6. However, instead of automatically causing the collaborative interaction session 285 to resume at the stored collaborative interaction session state 251, 251' as shown in FIG. 8C, in some embodiments, with reference to FIG. 8D, the first device 200 may transmit instructions (e.g., signal 283) for the second device 220 to prompt the user to determine whether to resume the collaborative interaction session at the stored state (e.g., prompt 286'). As such, a prompt 286' of "RESUME SESSION?" with a selection capability of "Y" (e.g., a "Yes" virtual button 287') or "N" (e.g., a "No" virtual button 289') could be displayed on the second device 220. Additionally or alternatively, the first device 200 may cause display of a similar prompt 286.

In response to the either prompt 286 or prompt 286' shown in FIG. 8D, one of the users may select to have the collaborative interaction session resumed at the stored state. In such a circumstance, with reference to FIG. 8E, the first device 200 and the second device 220 may resume the collaborative interaction session 285 at the stored state 251, 251'.

However, with reference to FIG. 8F, one of the users may select not to have the collaborative interaction session resumed at the stored state. In such a circumstance, the first device 200 and second device 220 may not enter the collaborative interaction session state at the stored state. It should be noted however, that though FIG. 8F does not illustrate a currently active collaborative interaction session, some embodiments of the present invention may still enable a new and/or different collaborative interaction session to initiate between the first device and second device even in an instance in which one of the users selects not to have the stored state resumed.

In some embodiments, each prompt 286, 286' may have a time limit that automatically determines that the user does not wish to have the collaborative interaction session resumed at the stored state. For example, if one of the users has not selected "Y" or "N" after a pre-determined amount of time (e.g., 5 seconds, 10 seconds, etc.), the first device 200 may determine that the stored collaborative interaction session state should not be resumed.

Though an example embodiment is described herein with respect to two devices (e.g., a first device and a second device), certain embodiments of the present invention contemplate a collaborative interaction session between more than two devices. As such, the apparatus 102 may account for more than one "second" device when determining a positional relationship (e.g., a first, second, or third positional relationship as described herein).

For example, with reference to FIG. 9, a first device 200 may be engaged in a collaborative interaction session with a second device 220 and a third device 290. In the depicted embodiment, the collaborative interaction session comprises playing a game of tic-tac-toe 291 on the third device 290. Such a collaborative interaction session may, in some cases, be performed through signals between the first device 200 to the third device 290 (e.g., signal 292) and from signals between the second device 220 and the third device 290 (e.g., signal 293), though other communication signal structures are contemplated. In such a circumstance, the first device 200 may receive an indication (e.g., signal 295) of the position and/or orientation of the third device 290 and an indication (e.g., signal 294) of the position and/or orientation of the second device 220. The first device 200 may then determine a first positional relationship of the front edge 206 of the first device 200 facing the left side 296 of the third device 290 and the front edge 226 of the second device 220 facing the right side 297 of the third device 290. Additionally, the first device 200 may determine the first positional relationship based on proximity of any of the devices to with respect to each other (e.g., the first device to third device, the first device to the second device, etc.)

In some embodiments, the apparatus 102 may be configured to resume display of an orientation of the collaborative interaction session based on a relationship between the second positional relationship and the first positional relationship. For example, the apparatus 102 may be configured to resume display of the tic-tac-toe board 291 in a proper orientation, such as with the "O" nearest the second device 220 and the "X" nearest the first device 200. This may be equivalent to the second device 220 facing the "bottom" of the tic-tac-toe board 291 and the first device 200 facing the "top" of the tic-tac-toe board 291. Such an embodiment may be even more useful for more complicated and/or side specific collaborative interaction sessions (e.g., chess, battleship, etc.).

Though some examples described herein describe embodiments of the present invention from the perspective of first device, embodiments of the present invention are not meant to be limited to the perspective of the first device and contemplate utilization from the perspective of any device, including devices not even depicted (e.g., servers or other network entities).

Embodiments of the present invention provide methods, apparatus and computer program products for saving and resuming a state of a collaborative interaction session between devices based on the positional relationship of the devices with respect to each other. Various examples of the operations performed in accordance with embodiments of the present invention will now be provided with reference to FIGS. 10-11.

FIG. 10 illustrates a flowchart according to an example method for saving and resuming a state of a collaborative interaction session between devices based on the positional relationship of the devices with respect to each other according to an example embodiment 300. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 302 may comprise determining, in an instance in which a first device and at least one second device are engaged in a collaborative interaction session, a first positional relationship between the first device and the at least one second device. The processor 110, communication interface 114, and/or sensor 118 may, for example, provide means for performing operation 302. Operation 304 may comprise receiving an indication of termination of the collaborative interaction session between the first device and the at least one second device. The processor 110, communication interface 114, user interface 116, sensor 118, and/or UI control circuitry 122 may, for example, provide means for performing operation 304. Operation 306 may comprise determining the collaborative interaction session state. The processor 110 may, for example, provide means for performing operation 306. Operation 308 may comprise causing the collaborative interaction session state to be stored. The processor 110 and/or memory 112 may, for example, provide means for performing operation 308.

Operation 310 may comprise determining a second positional relationship between the first device and the at least one second device. The processor 110, communication interface 114, and/or sensor 118 may, for example, provide means for performing operation 310. Operation 312 may comprise causing the collaborative interaction session between the first device and the at least one second device to resume at the stored collaborative interaction session state based upon a relationship between the first positional relationship and the second positional relationship. The processor 110, memory 112, communication interface 114, user interface 116, sensor 118, and/or UI control circuitry 122 may, for example, provide means for performing operation 312.

FIG. 11 illustrates a flowchart according to an example method for saving and resuming a state of a collaborative interaction session between devices based on the positional relationship of the devices with respect to each other according to an example embodiment 400. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 402 may comprise determining, in an instance in which a first device and at least one second device are engaged in a collaborative interaction session, a first positional relationship between the first device and the at least one second device. The processor 110, communication interface 114, and/or sensor 118 may, for example, provide means for performing operation 402. Operation 404 may comprise receiving an indication of termination of the collaborative interaction session by determining a third positional relationship between the first device and the at least one second device and determining an instance in which the third positional relationship does not satisfy the first positional relationship within a predetermined positional relationship tolerance. The processor 110, communication interface 114, user interface 116, sensor 118, and/or UI control circuitry 122 may, for example, provide means for performing operation 404. Operation 406 may comprise determining the collaborative interaction session state. The processor 110 may, for example, provide means for performing operation 406. Operation 408 may comprise causing the collaborative interaction session state to be stored. The processor 110 and/or memory 112 may, for example, provide means for performing operation 408.

Operation 410 may comprise determining a second positional relationship between the first device and the at least one second device. The processor 110, communication interface 114, and/or sensor 118 may, for example, provide means for performing operation 410. Operation 412 may comprise causing the collaborative interaction session between the first device and the at least one second device to resume at the stored collaborative interaction session state based upon a relationship between the first positional relationship and the second positional relationship. The processor 110, memory 112, communication interface 114, user interface 116, sensor 118, and/or UI control circuitry 122 may, for example, provide means for performing operation 412.

FIGS. 10-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, by a processor, in an instance in which a first device and at least one second device are engaged in a collaborative interaction session, a first positional relationship between the first device and the at least one second device, wherein the first positional relationship is based at least in part on a first orientation relationship of the first device relative to the at least one second device, wherein the first orientation relationship is defined by at least a first direction that a portion of the first device faces relative to a portion of the second device;
   receiving an indication of termination of the collaborative interaction session between the first device and the at least one second device;
   determining the collaborative interaction session state;
   causing the collaborative interaction session state to be stored;
   determining a second positional relationship between the first device and the at least one second device, wherein the second positional relationship is based at least in part on a second orientation relationship of the first device relative to the at least one second device, wherein the second orientation relationship is defined by at least a second direction that the portion of the first device faces relative to the portion of the second device; and
   causing the collaborative interaction session between the first device and the at least one second device to resume at the stored collaborative interaction session state in an instance in which the second positional relationship satisfies the first positional relationship within a predetermined positional relationship tolerance.

2. The method according to claim 1, wherein determining the first positional relationship further comprises determining the first positional relationship based at least in part on the proximity of the first device to the at least one second device, and wherein determining the second positional relationship further comprises determining the second positional relationship based at least in part on the proximity of the first device to the at least one second device.

3. The method according to claim 1, wherein receiving an indication of termination of the collaborative interaction session comprises receiving an indication from the first device or the at least one second device that the collaborative interaction session is terminated.

4. The method according to claim 1, wherein receiving an indication of termination of the collaborative interaction session comprises determining a third positional relationship between the first device and the at least one second device based at least in part on orientation of the first device relative to the at least one second device and determining an instance in which the third positional relationship does not satisfy the first positional relationship within a pre-determined positional relationship tolerance.

5. The method according to claim 1, wherein causing the collaborative interaction session between the first device and the at least one second device to resume at the stored collaborative interaction session state comprises automatically causing the collaborative interaction session between the first device and the at least one second device to resume at the stored collaborative interaction session state in an instance in which the second positional relationship satisfies the first positional relationship within the predetermined positional relationship tolerance.

6. The method according to claim 1 further comprising causing a user of the first device or the at least one second device to be prompted as to whether the collaborative interaction session should be resumed at the stored collaborative interaction session state, and wherein causing the collaborative interaction session between the first device and the at least one second device to resume at the stored collaborative interaction session state comprises causing the collaborative interaction session between the first device and the at least one second device to resume at the stored collaborative interaction session state in an instance in which the user indicates that the collaborative interaction session should be resumed at the stored collaborative interaction session state.

7. The method according to claim 1, wherein the second positional relationship satisfies the first position relationship within the predetermined positional relationship tolerance in an instance in which, at least, the second orientation relationship is within a predetermined orientation relationship tolerance of the first orientation relationship.

8. An apparatus comprising a processor and a memory including computer program code, the memory and the computer program code configured to, with the processor, cause the apparatus to:
   determine, in an instance in which a first device and at least one second device are engaged in a collaborative interaction session, a first positional relationship between the first device and the at least one second device, wherein the first positional relationship is based at least in part on a first orientation relationship of the first device relative to the at least one second device, wherein the first orientation relationship is defined by at least a first direction that a portion of the first device faces relative to a portion of the second device;
   receive an indication of termination of the collaborative interaction session between the first device and the at least one second device;
   determine the collaborative interaction session state;
   cause the collaborative interaction session state to be stored;
   determine a second positional relationship between the first device and the at least one second device, wherein the second positional relationship is based at least in part on a second orientation relationship of the first device relative to the at least one second device, wherein the second orientation relationship is defined by at least a second direction that the portion of the first device faces relative to the portion of the second device; and
   cause the collaborative interaction session between the first device and the at least one second device to resume at the stored collaborative interaction session state in an instance in which the second positional relationship satisfies the first positional relationship within a predetermined positional relationship tolerance.

9. The apparatus according to claim 8, wherein the memory and the computer program code are further configured to, with the processor, cause the apparatus to determine the first positional relationship by further determining the first positional relationship based at least in part on the proximity of the first device to the at least one second device, and wherein the memory and the computer program code are further configured to, with the processor, cause the apparatus to determine the second positional relationship by further determining the second positional relationship based at least in part on the proximity of the first device to the at least one second device.

10. The apparatus according to claim 8, wherein the memory and the computer program code are further configured to, with the processor, cause the apparatus to receive an indication of termination of the collaborative interaction session by receiving an indication from the first device or the at least one second device that the collaborative interaction session is terminated.

11. The apparatus according to claim 8, wherein the memory and the computer program code are further configured to, with the processor, cause the apparatus to receive an indication of termination of the collaborative interaction session by determining a third positional relationship between the first device and the at least one second device based at least in part on orientation of the first device relative to the at least one second device and determining an instance in which the third positional relationship does not satisfy the first positional relationship within a pre-determined positional relationship tolerance.

12. The apparatus according to claim 8, wherein the memory and the computer program code are further configured to, with the processor, cause the apparatus to cause the collaborative interaction session between the first device and the at least one second device to resume at the stored collaborative interaction session state by automatically causing the collaborative interaction session between the first device and the at least one second device to resume at the stored collaborative interaction session state in an instance in which the second positional relationship satisfies the first positional relationship within the redetermined.

13. The apparatus according to claim 8, wherein the memory and the computer program code are further configured to, with the processor, cause the apparatus to cause a user of the first device or the at least one second device to be prompted as to whether the collaborative interaction session should be resumed at the stored collaborative interaction session state, and wherein the memory and the computer program code are further configured to, with the processor, cause the apparatus to cause the collaborative interaction session between the first device and the at least one second device to resume at the stored collaborative interaction session state by causing the collaborative interaction session between the first device and the at least one second device to resume at the stored collaborative interaction session state in an instance in which the user indicates that the collaborative interaction session should be resumed at the stored collaborative interaction session state.

14. The apparatus according to claim 8, wherein the second positional relationship satisfies the first position relationship within the predetermined positional relationship tolerance in an instance in which, at least, the second orientation relationship is within a predetermined orientation relationship tolerance of the first orientation relationship.

15. Computer program product comprising a non-transitory computer readable memory having program code portions stored thereon, the program code portions being
    a computer readable medium and configured when said program product is run on a computer or network device, to:
    determine, in an instance in which a first device and at least one second device are engaged in a collaborative interaction session, a first positional relationship between the first device and the at least one second device, wherein the first positional relationship is based at least in part on a first orientation relationship of the first device relative to the at least one second device, wherein the first orientation relationship is defined by at least a first direction that a portion of the first device faces relative to a portion of the second device;
    receive an indication of termination of the collaborative interaction session between the first device and the at least one second device;
    determine the collaborative interaction session state;
    cause the collaborative interaction session state to be stored;
    determine a second positional relationship between the first device and the at least one second device, wherein the second positional relationship is based at least in part on a second orientation relationship of the first device relative to the at least one second device, wherein the second orientation relationship is defined by at least a second direction that the portion of the first device faces relative to the portion of the second device; and
    cause the collaborative interaction session between the first device and the at least one second device to resume at the stored collaborative interaction session state n an instance in which the second positional relationship satisfies the first positional relationship within a predetermined positional relationship tolerance.

16. The computer program product according to claim 15, wherein the second positional relationship satisfies the first position relationship within the predetermined positional relationship tolerance in an instance in which, at least, the second orientation relationship is within a predetermined orientation relationship tolerance of the first orientation relationship.

\* \* \* \* \*

UNITED STATES PATENT AND TRADEMARK OFFICE
CERTIFICATE OF CORRECTION

PATENT NO. : 9,191,798 B2  
APPLICATION NO. : 13/416725  
DATED : November 17, 2015  
INVENTOR(S) : Dearman Page 1 of 1

It is certified that error appears in the above-identified patent and that said Letters Patent is hereby corrected as shown below:

On the title page, item (73): "Nokia Technologies Oy, Espoo, FL (US)" should read
--Nokia Technologies Oy, Espoo (FI)--.

In the claims:
Column 29,
Line 41, claim 12, "within the redetermined" should read --within the predetermined--.

Signed and Sealed this
Twelfth Day of April, 2016

Michelle K. Lee
*Director of the United States Patent and Trademark Office*